(12) United States Patent
Kumar et al.

(10) Patent No.: US 12,498,444 B2
(45) Date of Patent: Dec. 16, 2025

(54) SYSTEMS AND METHODS FOR SELECTION OF POSITIONING BASED ON USER EQUIPMENT CONSIDERATIONS

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/020,016

(22) PCT Filed: Aug. 11, 2021

(86) PCT No.: PCT/US2021/045611
§ 371 (c)(1),
(2) Date: Feb. 6, 2023

(87) PCT Pub. No.: WO2022/060493
PCT Pub. Date: Mar. 24, 2022

(65) Prior Publication Data
US 2023/0296718 A1    Sep. 21, 2023

(30) Foreign Application Priority Data

Sep. 15, 2020   (IN) .............. 202041039944

(51) Int. Cl.
*H04L 1/00* (2006.01)
*G01S 5/00* (2006.01)
*G01S 5/02* (2010.01)

(52) U.S. Cl.
CPC .............. *G01S 5/01* (2020.05); *G01S 5/0027* (2013.01); *G01S 5/0036* (2013.01); *G01S 5/011* (2020.05); *G01S 5/019* (2020.05); *G01S 5/0236* (2013.01)

(58) Field of Classification Search
CPC ........ G01S 5/01; G01S 5/0027; G01S 5/0036; G01S 5/011; G01S 5/019; G01S 5/0236; H04W 64/00; H04W 24/08; H04L 5/0048
(Continued)

(56) References Cited

U.S. PATENT DOCUMENTS 9,338,591 B1    5/2016   Vivanco et al.
9,942,714 B2 *  4/2018   Fu .................. H04W 4/026
(Continued)

FOREIGN PATENT DOCUMENTS

| CN | 101911147 A | 12/2010 |
| CN | 111345070 A | 6/2020 |
| WO | 2018093835 A1 | 5/2018 |

OTHER PUBLICATIONS

International Search Report and Written Opinion—PCT/US2021/045611—ISA/EPO—Nov. 12, 2021.
(Continued)

*Primary Examiner* — Tanmay K Shah
(74) *Attorney, Agent, or Firm* — QUALCOMM Incorporated

(57) ABSTRACT

Methods and techniques are described for supporting location services for a user equipment (UE) in which the UE evaluate available positioning methods based on one or more criteria to determine a prioritized positioning method and provides an indication of the prioritized positioning method to a location server. The UE may additionally provide an indication of the criteria upon which the prioritized positioning method was determined. The UE may send the indication of the prioritized positioning method before the UE performs the positioning measurements and the location server may accept or reject the prioritized positioning method. The UE may alternatively send the indication of the prioritized positioning method and the criteria used in the priority determination after the UE performs the posi- (Continued)

tioning measurements. The location server may use the prioritized positioning method and the criteria used in the priority determination, e.g., in subsequent positioning requests for the UE.

28 Claims, 10 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 10,327,109 | B1 | 6/2019 | Maheshwari et al. |
| 10,660,109 | B2 | 5/2020 | Bitra et al. |
| 2007/0281662 | A1* | 12/2007 | Kim ..................... H04W 4/029 |
| | | | 455/404.2 |
| 2009/0219209 | A1* | 9/2009 | Bush ..................... G01S 5/019 |
| | | | 342/357.77 |
| 2017/0280280 | A1 | 9/2017 | Jain et al. |

OTHER PUBLICATIONS

"UserPlane Location Protocol, OMA-TS-ULP-V2_0-20070727-D-cb," OMA-TS-ULP-V2_0-20070727-D-CB, Open Mobile Alliance (OMA), 4330 LA Jolla Village DR., Suite 110 San Diego, CA 92122, USA, No. 2.0, Jul. 27, 2007 (Jul. 27, 2007), pp. 1-294, XP064091769, Retrieved from the Internet: URL: http://ftp/Public_documents/LOC/Permanent_documents/ [retrieved on Jul. 30, 2007] the whole document.

Qualcomm Incorporated: "Potential Techniques for NR Positioning", 3GPP TSG-RAN WG1 Meeting #95, R1-1813452, Spokane, USA, Nov. 12-16, 2018, Nov. 3, 2018, pp. 1-8.

* cited by examiner

SYSTEMS AND METHODS FOR SELECTION OF POSITIONING BASED ON USER EQUIPMENT CONSIDERATIONS

CROSS REFERENCE TO RELATED APPLICATION(S)

This application is a National Stage Application filed under 35 U.S.C. § 371 of PCT International Application No. PCT/US2021/045611, entitled "SYSTEMS AND METHODS FOR SELECTION OF POSITIONING BASED ON USER EQUIPMENT CONSIDERATIONS" and filed Aug. 11, 2021, which claims priority to India application No. 202041039944, filed Sep. 15, 2020, entitled "SYSTEMS AND METHODS FOR SELECTION OF POSITIONING BASED ON USER EQUIPMENT CONSIDERATIONS," which are incorporated herein by reference in [its] their entirety.

BACKGROUND

Background

The present disclosure relates generally to communication, and more specifically to techniques for supporting location services for user equipments (UEs) served by a wireless network.

Relevant Background

It is often desirable to know the location of a user equipment (UE) such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a reference signals, such as positioning reference signal (PRS), that may be received and measured by the mobile device. For example, a UE may generate positioning measurements from the downlink (DL) reference signals such as Reference Signal Time Difference (RSTD), Reference Signal Received Power (RSRP), and reception and transmission (Rx-Tx) time difference measurements, which may be used in downlink positioning methods, such as DL-Time Difference of Arrival (TDOA), DL-Angle of Departure (AOD). Similarly, a mobile device may transmit reference signals, for example, sounding reference signals (SRS), that are received and measured by base stations. A base station may generate positioning measurements from the uplink (UL) SRS such as RSTD and Rx-Tx, which may be used in uplink positioning methods, such as UL-TDOA, UL-AOA. Additionally, combined measurements using PRS and SRS, such as Rx-Tx, may be used for combined DL and UL based positioning included, e.g., round-trip time (RTT), which may be with one or more neighboring base stations (multi-RTT). The selection of which positioning measurement and positioning method are used for position determination of the mobile device may effect performance of both the mobile device and the wireless network.

SUMMARY

Methods and techniques are described for supporting location services for a user equipment (UE) in which the UE evaluate available positioning methods based on one or more criteria to determine a prioritized positioning method and provides an indication of the prioritized positioning method to a location server. The UE may additionally provide an indication of the criteria upon which the prioritized positioning method was determined. The UE may send the indication of the prioritized positioning method before the UE performs the positioning measurements and the location server may accept or reject the prioritized positioning method. The UE may alternatively send the indication of the prioritized positioning method and the criteria used in the priority determination after the UE performs the positioning measurements. The location server may use the prioritized positioning method and the criteria used in the priority determination, e.g., in subsequent positioning requests for the UE.

In one implementation, a method performed by a user equipment (UE) for supporting location services for the UE includes receiving assistance data from a location server, the assistance data comprising configuration parameters for multiple positioning methods; evaluating one or more criteria using the configuration parameters and internal UE factors for each of the multiple positioning methods to determine a prioritized positioning method; performing positioning measurements for the prioritized positioning method; and sending a message to the location server identifying the prioritized positioning method and an indication of the one or more criteria used to determine the prioritized positioning method.

In one implementation, a user equipment (UE) configured to support location services for the UE, includes at least one wireless transceiver configured to wirelessly communicate with at least one wireless network; at least one memory; and at least one processor coupled to the at least one wireless transceiver and the at least one memory and configured to: receive assistance data from a location server, the assistance data comprising configuration parameters for multiple positioning methods; evaluate one or more criteria using the configuration parameters and internal UE factors for each of the multiple positioning methods to determine a prioritized positioning method; perform positioning measurements for the prioritized positioning method; and send a message to the location server identifying the prioritized positioning method and an indication of the one or more criteria used to determine the prioritized positioning method.

In one implementation, a user equipment (UE) configured for supporting location services for the UE includes means for receiving assistance data from a location server, the assistance data comprising configuration parameters for multiple positioning methods; means for evaluating one or more criteria using the configuration parameters and internal UE factors for each of the multiple positioning methods to determine a prioritized positioning method; means for performing positioning measurements for the prioritized positioning method; and means for sending a message to the location server identifying the prioritized positioning method and an indication of the one or more criteria used to determine the prioritized positioning method.

In one implementation, a non-transitory storage medium including program code stored thereon, the program code is operable to configure at least one processor in a user equipment (UE) to support location services for the UE, the program code comprising instructions to: receive assistance data from a location server, the assistance data comprising configuration parameters for multiple positioning methods; evaluate one or more criteria using the configuration parameters and internal UE factors for each of the multiple positioning methods to determine a prioritized positioning method; perform positioning measurements for the prioritized positioning method; and send a message to the location server identifying the prioritized positioning method and an indication of the one or more criteria used to determine the prioritized positioning method.

In one implementation, a method performed by a location server for supporting location services for a user equipment (UE) including sending assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and receiving a message from the UE identifying the prioritized positioning method and an indication of the one or more criteria used to determine the prioritized positioning method.

In one implementation, a location server configured to support location services for a user equipment (UE), includes a communications interface configured to communicate a UE in a wireless network; at least one memory; and at least one processor coupled to the at least communications interface and the at least one memory and configured to: send assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and receive a message from the UE identifying the prioritized positioning method and an indication of the one or more criteria used to determine the prioritized positioning method.

In one implementation, a location server configured for supporting location services for a user equipment (UE) includes means for sending assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and means for receiving a message from the UE identifying the prioritized positioning method and an indication of the one or more criteria used to determine the prioritized positioning method.

In one implementation, a non-transitory storage medium including program code stored thereon, the program code is operable to configure at least one processor in a location server to support location services for a user equipment (UE), the program code comprising instructions to: send assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and receive a message from the UE identifying the prioritized positioning method and an indication of the one or more criteria used to determine the prioritized positioning method.

BRIEF DESCRIPTION OF THE DRAWINGS

An understanding of the nature and advantages of various embodiments may be realized by reference to the following figures.

Figure 1:
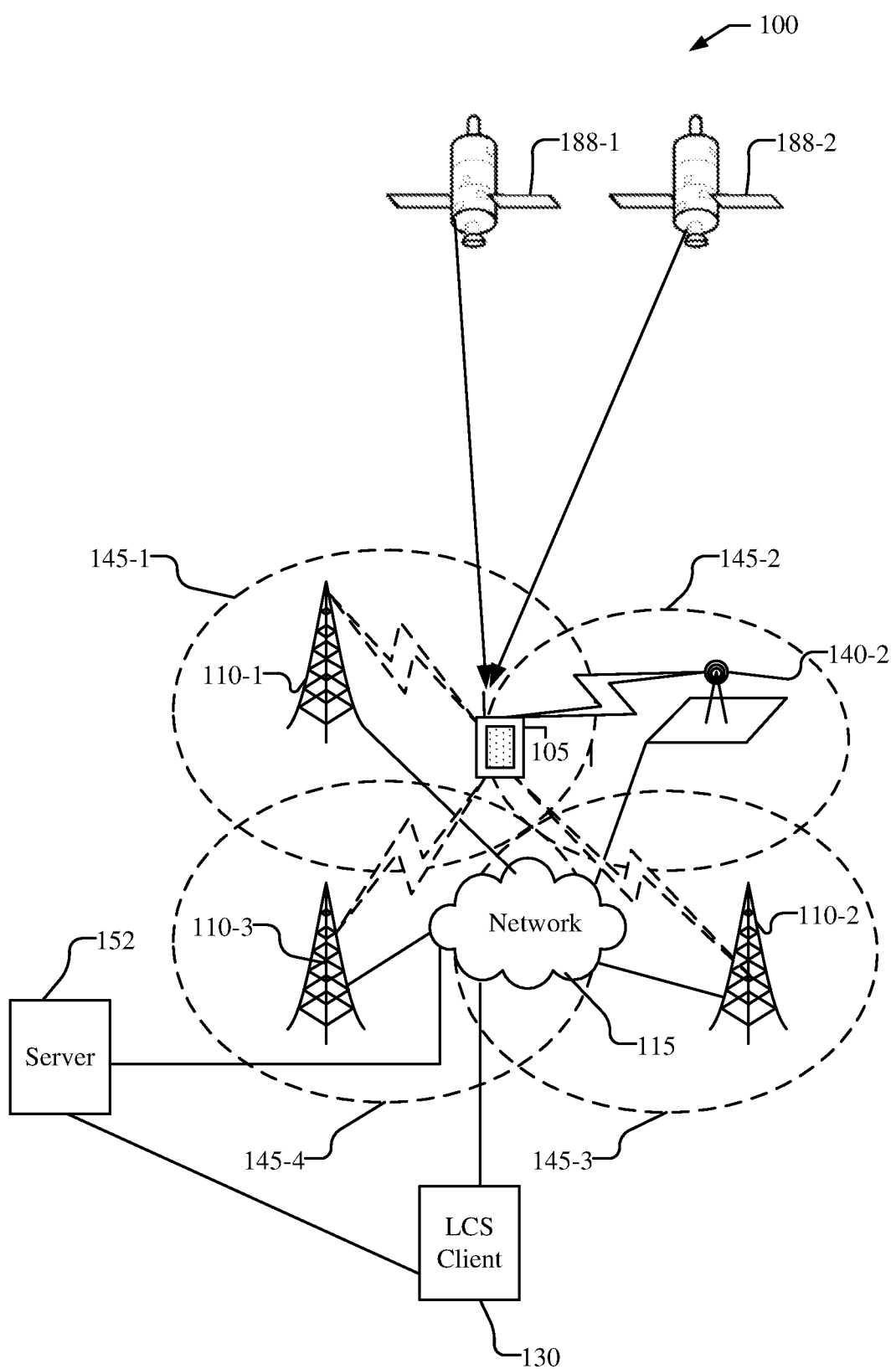
FIG. 1 shows an architecture of a system capable of providing location services to a User Equipment.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as either 110-1, 110-2, 110-3 etc. When referring to such an element using only the first number, any instance of the element is to be understood (e.g. elements 110 in the previous example may refer to elements 110-1, 110-2 and 110-3).

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by at least one processor, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on. As discussed herein, positioning of the UE is performed using consumer based positioning techniques, including terrestrial wireless positioning and/or satellite based positioning.

A base station or transmission point or transmission reception point (TRP) may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical Transmission and Reception Points (TRPs) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AOD), Round Trip Time (RTT) or multi cell RTT (Multi-RTT), and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler). Additionally or alternatively, the UE may be provided with SRS configuration information and instructed to transmit SRS for positioning. One or more base stations may receive and process the transmitted SRS based on the configuration information and perform various positioning measurements of the SRS, which may be provided to a network entity, such as the location server or the UE, for position estimation, e.g., using UL-TDOA or RTT or Multi-RTT.

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning of a UE, e.g., UE assisted positioning or UE based positioning, several different positioning methods may be used. For example, downlink (DL) reference signal (RS) based positioning may be used. In DL RS based positioning, the UE may receive DL RSs, such as PRS, from one or more base stations and may generate positioning measurements such as Reference Signal Time Difference (RSTD), Reference Signal Received Power (RSRP), and reception and transmission (Rx-Tx) time difference measurements, that may be used in DL positioning methods, such as DL-Time Difference of Arrival (TDOA), DL-Angle of Departure (AOD).

Another example of a positioning method that may be used is uplink (UL) RS based positioning. In UL RS based positioning, the UE may transmit RSs, such as SRS, that are received and measured by base stations. By way of example, the base stations may generate positioning measurements from UL RSs, such as RSTD and Rx-Tx, which may be used in UL positioning methods, such as UL-TDOA, UL-Angle of Arrival (AOA).

Another example of a positioning method that may be used is combined DL and UL RS based positioning. In a combined DL and UL RS based positioning, the UE may receive and measure DL RSs, such as PRS, from one or more base stations and may transmit UL RSs, such as SRS, that are received and measured by base stations. For example, the UE and base stations may generate Rx-Tx measurements from the received DL and UL RSs, respectively, which may be used to generate a single round-trip time (RTT) measurement for one base station or RTT measurements for multiple base stations (multi-cell RTT).

Different positioning methods, e.g., DL, UL, or DL+UL reference signal based positioning methods may affect the UE in different ways. There are many UE specific considerations under which it may be preferable to use one positioning method over another. In current systems, however, if the location server and network support multiple different types of positioning methods, the decision to use on positioning method over another does not consider UE based preferences. For example, current positioning protocols do not provide a manner with which the UE can indicate a preference for one positioning method over others based on the UE's specific considerations.

In an implementation discussed herein, a UE may evaluate available positioning methods based on one or more criteria to determine a prioritized positioning method and provides an indication of the prioritized positioning method to a network entity, such as a location server or base station. The UE may additionally provide an indication of the criteria upon which the prioritized positioning method was determined. In one implementation, by way of example, the UE may send the indication of the prioritized positioning method before the UE performs the positioning measurements. The network entity, for example, may accept or reject the prioritized positioning method. In another implementation, the UE may send the indication of the prioritized positioning method and the criteria used in the priority determination after the UE performs the positioning measurements. The network entity, for example, may use the prioritized positioning method and the criteria used in the priority determination, e.g., in subsequent positioning requests for the UE.

FIG. 1 shows an architecture of a system 100 capable of supporting location services for UE 105, in which positioning methods prioritized by the UE 105 may be considered and used (or rejected) for positioning of the UE 105. The location services, for example, may include the transfer of location assistance data, including configuration parameters for multiple positioning methods, using messages such as Long Term Evolution (LTE) Positioning Protocol (LPP) or LPP extensions (LPPe) messages between a UE 105 and a server 152, which, in some instances, may take the form of a location server, such as an LMF, or another network entity and is referred to here as a location server. The transfer of the location information may occur at a rate appropriate to both UE 105 and location server 152. LPP is well-known and described in various publicly available technical specifications from 3GPP. LPPe has been defined by the Open Mobile Alliance (OMA) and may be used in combination with LPP such that each combined LPP/LPPe message would be an LPP message comprising an embedded LPPe message.

For simplicity, only one UE 105 and location server 152 are shown in FIG. 1. In general, system 100 may comprise multiple cells indicated by 145-$k$ (0≤k≤Ncells, where Ncells is the number of cells) with one or more networks 115, external clients 130, UEs 105, base stations 110 with antennas, and Space Vehicles (SVs) 188. System 100 may further comprise a mix of cells including macrocells such as cells 145-1, 145-3, and 145-4 along with femtocells such as cell 145-2 in a manner consistent with embodiments disclosed herein.

UE 105 may be capable of wirelessly communicating with location server 152 through network 115 (or through multiple networks 115) that support positioning and location services. For example, location services (LCS) may be performed on behalf of LCS Client 130, sometimes referred to as an external client 130, that accesses location server 152 and/or network 115 and issues a request for the location of UE 105. Location server 152 or network 115 may then respond to LCS client 130 with a location estimate for UE 105. LCS Client 130 may also be known as a Secure User Plane Location (SUPL) Agent—e.g. when the location solution used by location server 152 and UE 105 is the SUPL solution defined by OMA. In some embodiments, UE 105 may also include an LCS Client or a SUPL agent that may issue a location request to some positioning capable function within UE 105 and later receive back a location estimate for UE 105. The LCS Client or SUPL Agent within UE 105 may perform location services for the user of UE 105—e.g. provide navigation directions or identify points of interest within the vicinity of UE 105.

As illustrated in FIG. 1, the UE 105 may communicate with location server 152 through network 115 and base stations 110, which may be associated with network 115. UE 105 may receive and measure signals from antennas for base stations 110, which may be used for position determination. For example, UE 105 may receive and measure signals from antennas for one or more of base stations 110-1, 110-2, 110-3 and/or 110-4, which may be associated with cells 145-1, 145-2, 145-3 and 145-4, respectively. In some embodiments, base stations 110 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

UE 105 may also receive signals from one or more Earth orbiting Space Vehicles (SVs) 188-1 or 188-2 collectively referred to as SVs 188, which may be part of a satellite positioning system (SPS). SVs 188, for example, may be in a constellation of Global Navigation Satellite System (GNSS) such as the US Global Positioning System (GPS), the European Galileo system, the Russian Glonass system or the Chinese BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2A:
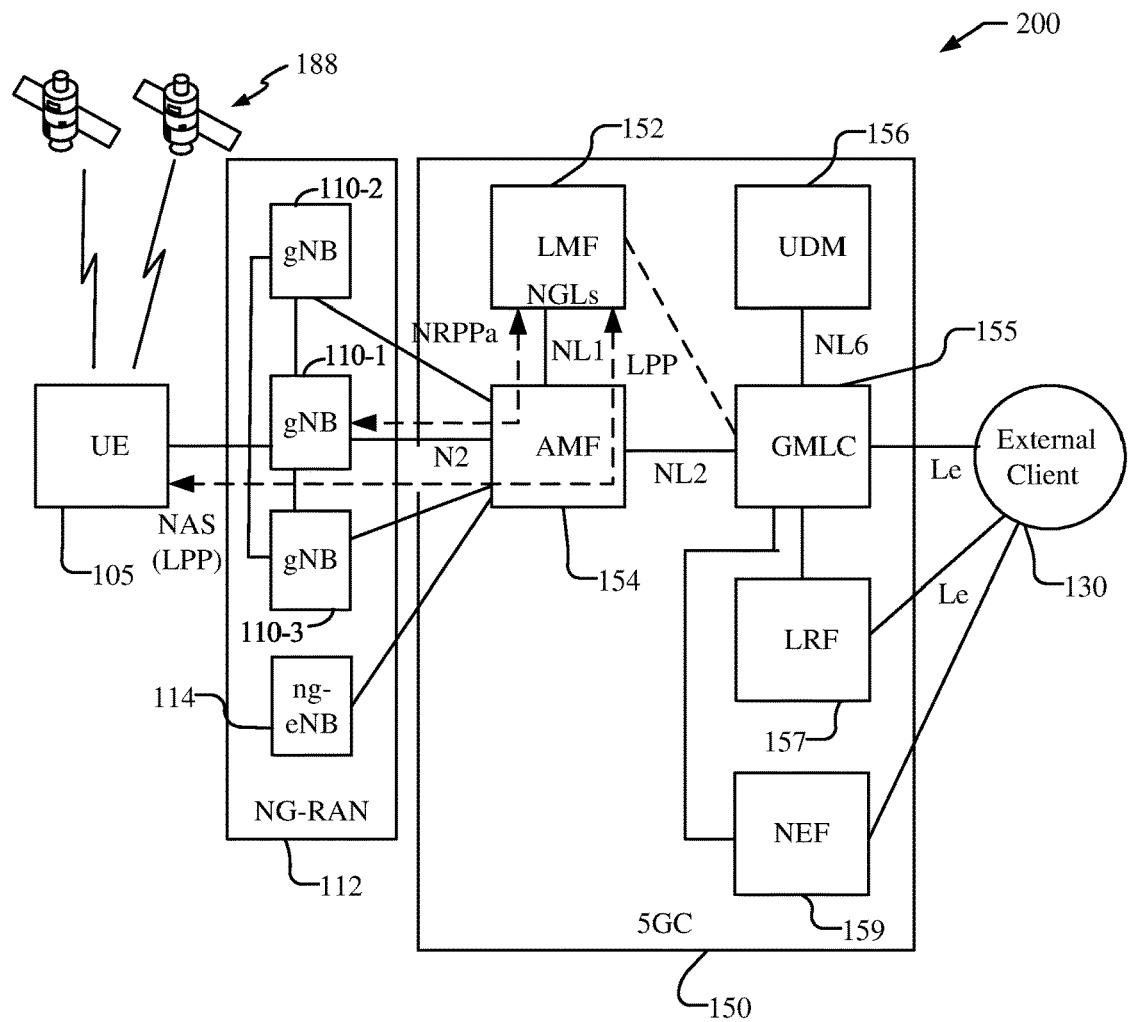
FIG. 2A is a block diagram illustrating a non-roaming reference architecture for UE location determination using time based and angle based muting of PRS transmitted by the base stations.

FIG. 2A is a simplified block diagram illustrating a communication system 200 for non-roaming support of UE 105 location based on prioritization of positioning methods by the UE 105, as discussed herein. Communication system 200 may be one example of the system 100 in FIG. 1, like designated elements being the same. The non-roaming communication system 200 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2 and 110-3 (collectively and generically referred to herein as gNBs 110), and a 5G Core Network (5GC) 150 that is in communication with an external client 130. A 5G network may also be referred to as a New Radio (NR) network; NG-RAN 112 may be referred to as an NR RAN or a 5G RAN; and 5GC 150 may be referred to as an Next Generation (NG) Core network (NGC). As an example, NG-RAN 112 may include one or more next generation eNBs (ng-eNBs) 114 which provide LTE wireless access to UE 105. Standardization of an NG-RAN and 5GC has been performed by 3GPP. The communication system 200 may further utilize information from satellite vehicles (SVs) 188 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 200 are described below. The communication system 200 may include additional or alternative components.

It should be noted that FIG. 2A provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 200. Similarly, the communication system 200 may include a larger or smaller number of SVs 188, gNBs 110, ng-eNBs 114, external clients 130, and/or other components. The illustrated connections that connect the various components in the communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2A illustrates a 5G-based network, similar network implementations and configurations may be used for other communication technologies, such as 3G, Long Term Evolution (LTE), IEEE 802.11 WiFi etc.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GC 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 150 not shown in FIG. 2A, or possibly via a Gateway Mobile Location Center (GMLC) 155) and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110 or ng-eNB 114. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from satellites 188 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110 or ng-eNB 114). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured by UE 105 relative to three or more terrestrial transmitters (e.g. gNBs 110) fixed at known locations or relative to four or more satellites 188 with accurately known orbital data, or combinations thereof, based at least in part, on pilots, reference signals (RS), such as positioning reference signals (PRS), or other reference signals transmitted by the transmitters or satellites and received at the UE 105. Here, a location server, such as the LMF 152, may be capable of providing positioning assistance data to UE 105 including, for example, information regarding signals to be measured (e.g., expected signal timing, signal coding, signal frequencies, signal Doppler, muting configuration), locations and identities of terrestrial transmitters (e.g. gNBs 110) and/or signal, timing and orbital information for GNSS satellites 188 to facilitate positioning methods, such as DL RS based positioning methods, UL RS based positioning methods, and combined DL and UL RS based positioning methods. The facilitation may include improving signal acquisition and measurement accuracy by UE 105 and, in some cases, enabling UE 105 to compute its estimated location based on the location measurements. For example, location servers may comprise an almanac which indicates locations and identities of cellular transceivers and/or local transceivers in a particular region or regions such as a particular venue, and may provide information descriptive of signals transmitted by a cellular base station or access point (AP) (e.g. a gNB 110) such as transmission power and signal timing.

A UE 105 may measure RSTD, RSRP, Rx-Tx, or other positioning measurements for DL RS based positioning methods, such as DL-TDOA and DL-AOD. The UE 105 may transmit UL RS, and one or more gNBs 110 may measure, e.g., the RSTD and Rx-Tx for UL RS based positioning methods, such as UL-TDOA, UL-AOA. Additionally, both the UE 105 and gNBs 110 may measure, e.g., Rx-Tx, for received DL RS and UL RS, respectively, for combined DL and UL RS based positioning methods such as RTT and multi-cell RTT. A UE 105 and gNBs 110 may transfer these measurements to a location server, such as LMF 152, to determine a location for UE 105, or in some implementations, may the UE 105 may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110 or ng-eNB 114) in NG-RAN 112 to determine a location for UE 105.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 2A, pairs of gNBs 110 in NG-RAN 112 may be connected to one another, e.g., directly as shown in FIG. 2A or indirectly via other gNBs 110. Access to the 5G network is provided to UE 105 via wireless communication between the UE 105 and one or more of the gNBs 110, which may provide wireless communication access to the 5GC 150 on behalf of the UE 105 using 5G (e.g. NR). In FIG. 2A, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 2A (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 2A depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GC 150. Thus, the NG-RAN 112 may include any combination of gNBs, eNBs, or other types of base stations or access points. As an example, NG-RAN 112 may include one or more next generation eNBs (ng-eNBs) 114 which provide LTE wireless access to UE 105 and may connect to entities in 5GC 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), DL-TDOA, DL-AOD, UL-TDOA, UL-AOA, RTT, multi-cell RTT, Observed Time Difference of Arrival (OTDOA), Real Time Kinematics (RTK), Precise Point Positioning (PPP), Differential GNSS (DGNSS), Enhanced Cell ID (ECID), WLAN positioning, and/or other position methods. The LMF 152 may also process location services requests for the UE 105, e.g., received from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using measurements of signals transmitted by wireless nodes, and assistance data provided to the UE 105). The LMF 152 may be referred to by other names such as a Location Manager (LM), Location Function (LF), commercial LMF (CLMF) or value added LMF (VLMF).

The GMLC 155 may support a location request for the UE 105 received from an external client 130 and may forward such a location request to the AMF 154, which may in turn forward the location request to the LMF 152. A location response from the LMF 152 (e.g. containing a location estimate for the UE 105) may be similarly returned to the GMLC 155 via the AMF 154, and the GMLC 155 may then return the location response (e.g., containing the location estimate) to the external client 130. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

As further illustrated in FIG. 2A, the LMF 152 and the gNBs 110 may communicate using a New Radio Positioning Protocol A (which may be referred to as NPPa or NRPPa). NRPPa may be defined in 3GPP Technical Specification (TS) 38.455, with NRPPa messages being transferred between the gNBs 110 and the LMF 152 via the AMF 154. As further illustrated in FIG. 2A, LMF 152 and UE 105 may communicate using the LTE Positioning Protocol (LPP) defined in 3GPP TS 36.355, where LPP messages are transferred between the UE 105 and the LMF 152 via the AMF 154 and a serving gNB 110-1 for UE 105. For example, LPP messages may be transferred between the LMF 152 and the AMF 154 using service based operations and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, WLAN, OTDOA, DL-TDOA, DL-AOD, UL-TDOA, UL-AOA, RTT, multi-cell RTT, and/or ECID. The NRPPa protocol may be used to support positioning of UE 105 using network based position methods such as ECID (when used with measurements obtained by a gNB 110) and/or may be used by LMF 152 to obtain location related information from gNBs 110 such as parameters defining DL RS transmission, such as PRS, from gNBs 110 for support of positioning and receive UL measurements from the gNBs used for positioning methods such as UL-TDOA, UL-AOA, RTT, and multi-cell RTT.

With a UE assisted position method, UE 105 may obtain location measurements (e.g. measurements of RSSI, RSTD, Rx-Tx, AOA, RSRP and/or RSRQ for gNBs 110, ng-eNBs 114 or WLAN APs, or measurements of GNSS pseudorange, code phase and/or carrier phase for SVs 188) and send the measurements to a location server (e.g. LMF 152) for computation of a location estimate for UE 105. With a UE based position method, UE 105 may obtain location measurements (e.g. which may be the same as or similar to location measurements for a UE assisted position method and may include UL measurements performed by gNBs 110) and may compute a location of UE 105 (e.g. with the help of assistance data received from a location server such as LMF 152 or broadcast by gNBs 110, ng-eNBs 114 or other base stations or APs). With a network based position method, one or more base stations (e.g. gNBs 110 and/or ng-eNBs 114) or APs may obtain location measurements (e.g. measurements of RSSI, Rx-Tx, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, DL RS based positioning methods, UL RS based positioning methods, combined DL and UL RS based positioning methods, (or some other position method). The LPP message may provide the UE 105 with configuration parameters for obtaining the one or more measurements necessary for the positioning methods. The UE 105 may send positioning information, e.g., the measurements or location estimate, back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to a Location Retrieval Function (LRF) 157, which handles retrieval of location information for the UE 105 and may be used to provide location information for UE 105 to an external client 130 that is a Public Safety Answering Point, e.g. following an emergency call from UE 105 to the PSAP.

To support services including location services from external clients 130 for Internet of Things (IoT) UEs, a Network Exposure Function (NEF) 159 may be included. The NEF 159, for example, may function to obtain a current or last known location for a UE 105, may obtain an indication of a change in location for a UE 105, or an indication of when a UE 105 becomes available (or reachable). An external client 130 (e.g. an external Client 130 that is an Application Function) may access NEF 159 in order to obtain location information for UE 105. The NEF 159 may be connected to the GMLC 155 to support last known location, current location and/or deferred periodic and triggered location for the UE 105. If desired, the NEF 159 may include, or may be combined with, the GMLC 155, and may then obtain location information for UE 105 from LMF 152 via AMF 154.

As noted, while the communication systems 100 and 200 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GC 150 may be connected to a WLAN using a Non-3GPP InterWorking Function (N3IWF, not shown) in the 5GC 150. For example, the WLAN may support IEEE 802.11 WiFi access for UE 105. Here, the N3IWF may connect to the WLAN and to other elements in the 5GC 150 such as AMF 154.

In other embodiments, the 5GC core 150 may be configured to control different air interfaces, such as the Evolved Universal Terrestrial Radio Access Network (E-UTRAN) comprising one or more evolved NodeBs (eNBs) in place of the gNBs 110 and ng-eNB 114. In some other embodiments, both the NG-RAN 112 and the 5GC 150 may be replaced by other RANs and other core networks. For example, in an Evolved Packet System (EPS) defined by 3GPP to support LTE access: the UE 105 may access the EPS rather than the NG-RAN 112 and 5GC 150; the NG-RAN 112 may be replaced by an E-UTRAN containing eNBs in place of the gNBs 110 an ng-eNB 114; and the 5GC 150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use an LTE Positioning Protocol A (LPPa) in place of NRPPa to send and receive location information to and from the eNBs in the E-UTRAN and may use LPP to support positioning of UE 105. In addition, in some implementations, base stations (e.g. similar to or based on a gNB 110 or ng-eNB 114) may function as positioning only beacons and transmit signals (e.g. PRS) to assist positioning of a UE 105 but not receive signals.

Figure 2B:
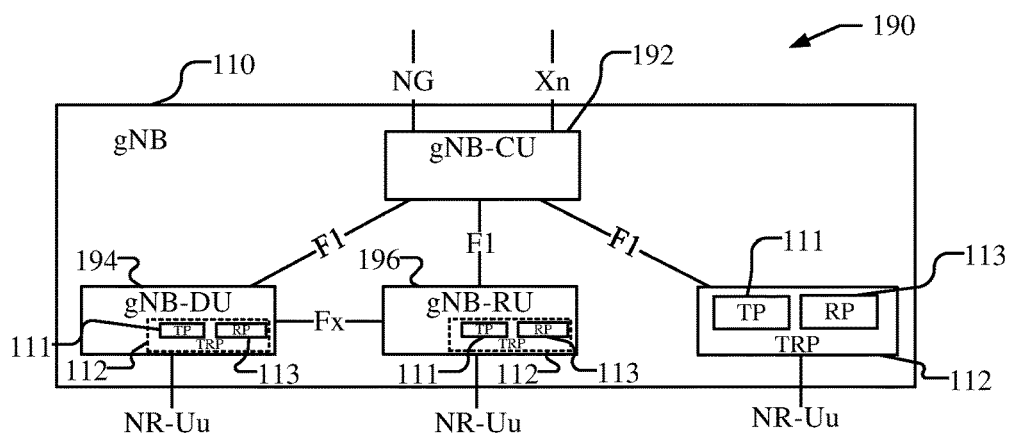
FIG. 2B shows an architecture diagram of an NG-RAN node that includes a gNB Central Unit, a gNB Distributed Unit, and gNB Remote Unit.

FIG. 2B shows an architecture diagram of an NG-RAN node 190 that may be within an NG-RAN 112 in FIG. 2A, e.g., as a separate entity or as part of another gNB. The NG-RAN node 190 may be a gNB 110, according to one implementation. The architecture shown in FIG. 2B, for example, may be applicable to any gNB 110 in FIG. 2A.

As illustrated, gNB 110 may include a gNB Central Unit (gNB-CU) 192, a gNB Distributed Unit (gNB-DU) 194, a gNB Remote Unit (gNB-RU) 196, which may be physically co-located in the gNB 110 or may be physically separate. The gNB-CU 192 is a logical or physical node hosting support for Radio Resource Control (RRC), Service Data Adaptation Protocol (SDAP) and Packet Data Convergence Protocol (PDCP) protocols of the gNB 110 used over the NR Uu air interface and controlling the operation of one or more gNB-DUs and/or gNB-RUs. The gNB-CU 192 terminates an F1 interface connected with a gNB-DU and in some implementations, an F1 interface connected with a gNB-RU. As illustrated, the gNB-CU 192 may communicate with an AMF via an NG interface. The gNB-CU 192 may further communicate with one or more other gNBs 110 via an Xn interface. The gNB-DU 194 is a logical or physical node hosting support for Radio Link Control (RLC), Medium Access Control (MAC) and Physical (PHY) protocol layers used over the NR Uu air interface of the gNB 110, operation of which is partly controlled by gNB-CU 192. The gNB-DU terminates the F1 interface connected with the gNB-CU 192, and may terminate a lower layer split point interface Fx with a gNB-RU. The gNB-RU 196 may be based on a lower layer function split and is a logical or physical node hosting support for lower layer functions, such as PHY and Radio Frequency (RF) protocol layers used over the NR Uu air interface of the gNB 110, operation of which is partly controlled by gNB-CU 192 and/or gNB-DU 194. The gNB-RU 196 terminates the Fx interface connected with the gNB-DU 194 and in some implementations may terminate the F1 interface connected with the gNB-CU 192.

The gNB-CU 192 requests positioning measurements (e.g. E-CID) to the gNB-DU 194 and/or gNB-RU 196. The gNB-DU 194 and/or gNB-RU 196 may report the measurements back to the gNB-CU 192. A gNB-DU 194 or gNB-RU 196 may include positioning measurement functionality. It should be understood that a separate measurement node is not precluded.

Additionally, as illustrated in FIG. 2B, gNB 110 may include a Transmission Point (TP) 111 and a Reception Point (RP) 113 combined into a Transmission Reception Point (TRP) 112, which may be physically or logically located in the gNB 110. The gNB-CU 192 may be configured to communicate with the TP 111 and RP 113, e.g., via F1 interfaces. The gNB-CU 192, thus, controls one or more TPs 111 and RPs 113 which are accessible from the gNB-CU 192 via an F1 interface.

In some embodiments, the NG-RAN node 190 (or gNB 110) may comprise a subset of the elements shown in FIG. 2B. For example, the NG-RAN node 190 may comprise the gNB-CU 192 but may not include one or more of gNB-DU 194 and gNB-RU 196, RP 113 or TP 111. Alternatively, NG-RAN node 190 may include one or more of gNB-DU 194 and, RP 113 or TP 111 but may not include gNB-RU 196. Further, the elements shown in FIG. 2B may be logically separate but physically co-located or may be partially or completely physically separate. For example, one or more of gNB-DU 194 and/or gNB-RU 196, RP 113 or TP 111 may be physically separate from gNB-CU 192 or may be physically combined with gNB-CU 192. In the case of physical separation, the F1 or Fx interface may define signaling over a physical link or connection between two separated elements. In some implementations, gNB-CU 192 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 194 and/or gNB-RU 196 to support NR Uu air interface signaling for control plane and user plane, respectively. However, only the gNB-CU-CP may interact with TPs 111 and RPs 113 to support and control location related communication.

Protocol layering between the gNB-CU 192 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 192 may comprise all location related procedures on NG, Xn, and NR-Uu interfaces. For example, the location procedures between AMF 115 and the NG-RAN node 190 may use NGAP. The location procedures between NG-RAN node 190 and other NG-RAN nodes, e.g., gNBs 110, may use XnAP or a protocol above XnAP, such as an extended NR Positioning Protocol A (NRPPa) as defined in 3GPP TS 38.455. The location procedures between NG-RAN node 190 and UE 105 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

Figure 3:
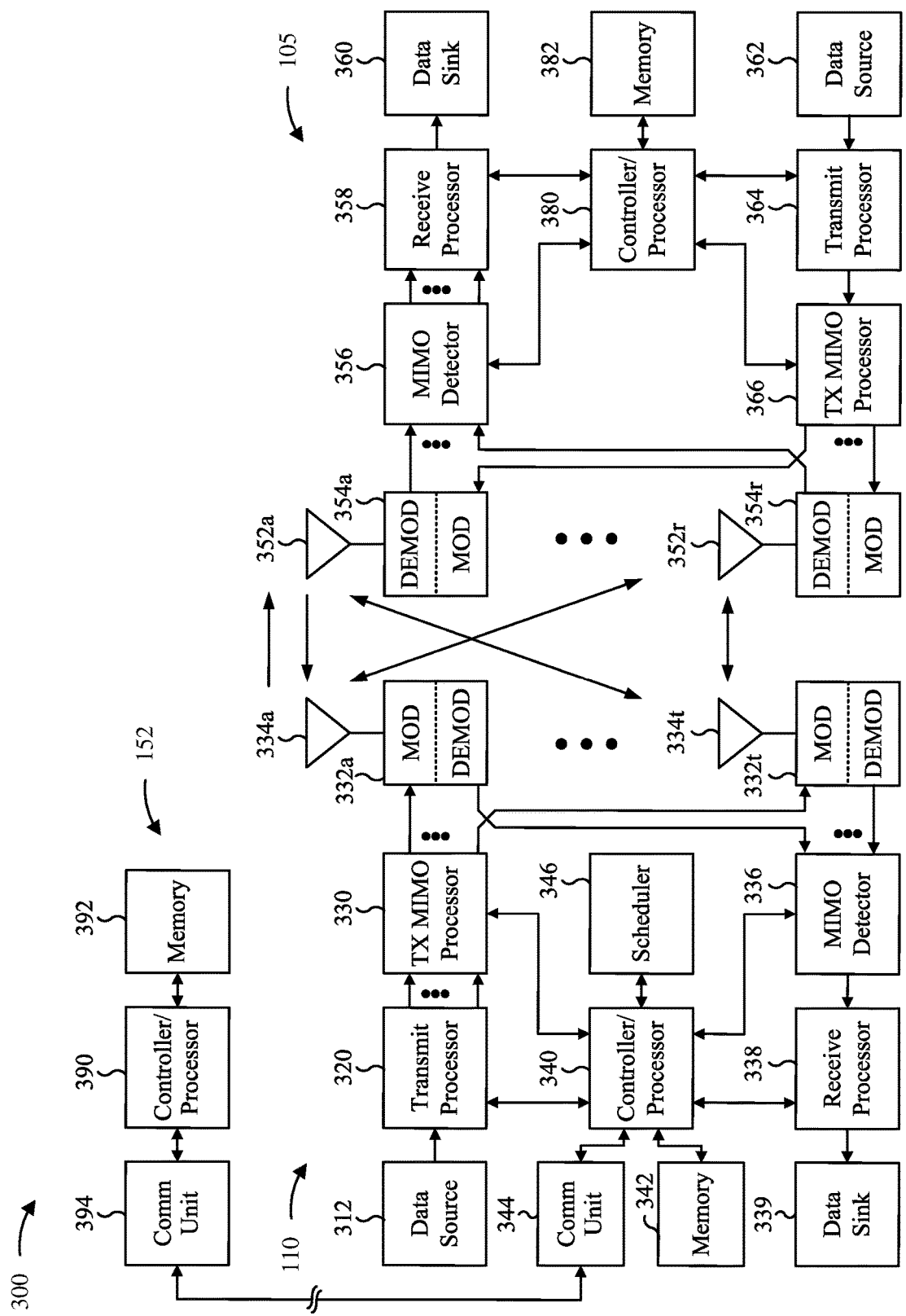
FIG. 3 shows a block diagram of a design of base station and UE.

FIG. 3 shows a block diagram of a design 300 of base station 110 and UE 105, which may be one of the base stations and one of the UEs in FIG. 1. Base station 110 may be equipped with T antennas 334a through 334t, and UE 105 may be equipped with R antennas 352a through 352r, where in general T≥1 and R≥1.

At base station 110, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 105, antennas 352a through 352r may receive the downlink signals from base station 110 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 105 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 105 may be included in a housing.

On the uplink, at UE 105, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 110. At base station 110, the uplink signals from UE 105 and other UEs may be received by antennas 334, processed by demodulators 332, detected by a MIMO detector 336 if applicable, and further processed by a receive processor 338 to obtain decoded data and control information sent by UE 105. Receive processor 338 may provide the decoded data to a data sink 339 and the decoded control information to controller/processor 340. Base station 110 may include communication unit 344 and communicate to location server 152 via communication unit 344. Location server 152 may include communication unit 394, controller/processor 390, and memory 392.

Controller/processor 340 of base station 110, controller/processor 380 of UE 105, controller/processor 390 of location server 152, and/or any other component(s) of FIG. 3 may perform one or more techniques associated broadcasting positioning assistance data in a differential manner, as described in more detail elsewhere herein. For example, controller/processor 380 of UE 105, controller/processor 340 of base station 110, controller/processor 390 of location server 152, and/or any other component(s) of FIG. 3 may perform or direct operations of, for example, process 900 and 1000 of FIGS. 9 and 10, and/or other processes as described herein. Memories 342, 382, and 392 may store data and program codes for base station 110, UE 105, and location server 152, respectively. In some aspects, memory 342 and/or memory 382 and/or memory 392 may comprise a non-transitory computer-readable medium storing one or more instructions for wireless communication. For example, the one or more instructions, when executed by one or more processors of the UE 105, the base station 110, and/or location server 152, may perform or direct operations of, for example, process 900 and 1000 of FIGS. 9 and 10 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
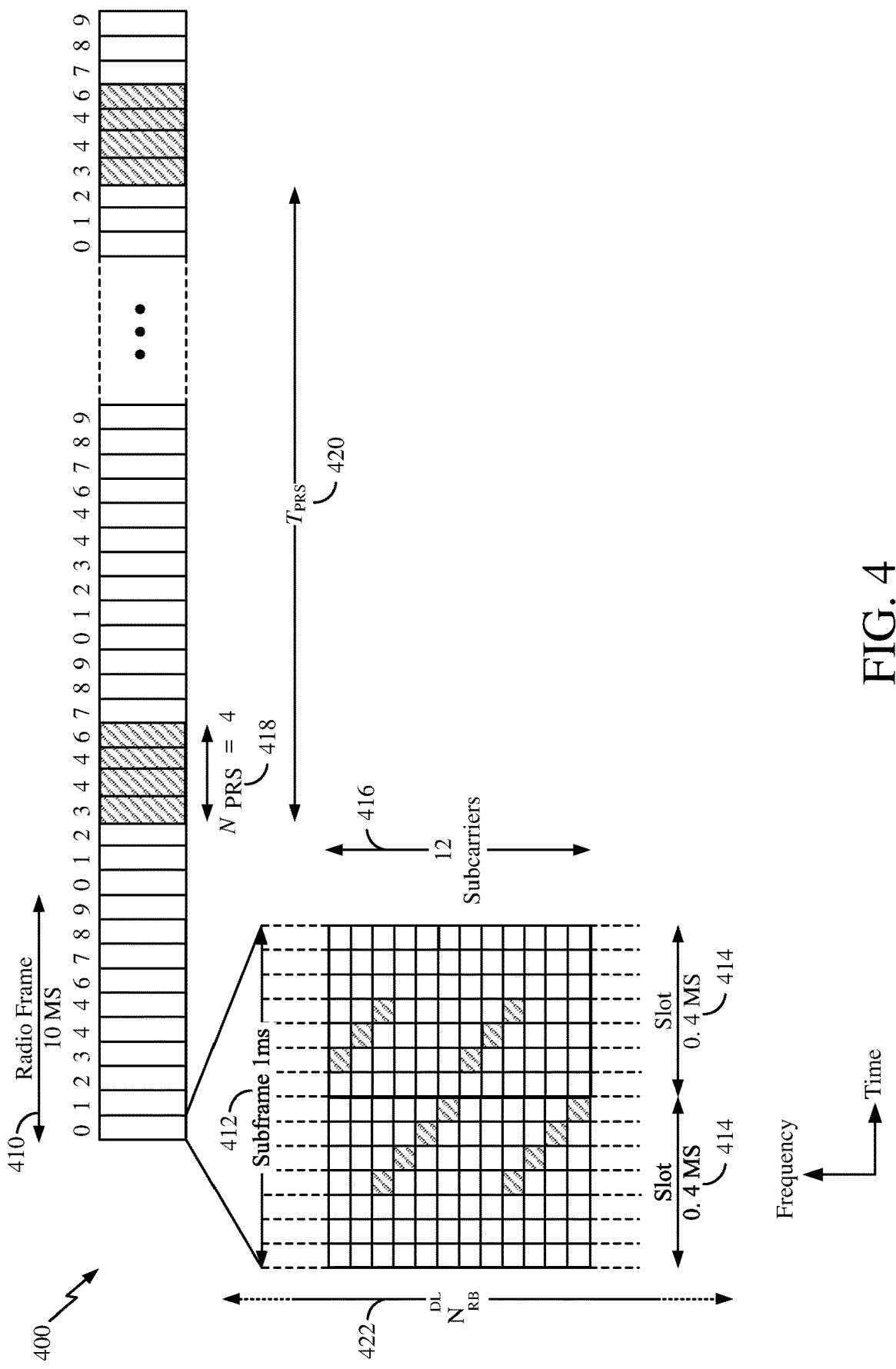
FIG. 4 shows a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as NRC=12. For a given channel bandwidth, the number of available resource blocks on each channel 422, which is also called the transmission bandwidth configuration 422, is indicated as NRB. For example, for a 3 MHz channel bandwidth in the above example, the number of available resource blocks on each channel 422 is given by NRB=15. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number NPRS of consecutive positioning subframes. The PRS positioning occasions for a cell supported by a base station may occur periodically at intervals, denoted by a number TPRS of milliseconds or subframes. As an example, FIG. 4 illustrates a periodicity of positioning occasions where NPRS equals 4 418 and TPRS is greater than or equal to 20 420. In some aspects, TPRS may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a jth positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as NPRS) or as a function of a physical cell identifier (PCI) (denoted as NG) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes (NPRS) per positioning occasion and a particular periodicity (TPRS). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations, the UE may perform various positioning measurement, such as RSTD, RSRP, and Rx-Tx measurements that may be used in DL positioning methods, such as DL-TDOA, and DL AOD, and in combined DL and UL positioning methods such as RTT and multi-cell RTT. Using received UL PRS (e.g. SRS) from the UE, the base stations may perform various positioning measurements, such as RSTD and Rx-Tx, which may be used in UL positioning methods, such as UL-TDOA, UL-AOA, and in combined DL and UL positioning methods such as RTT and multi-cell RTT.

There are UE specific considerations under which it may be preferable to use one positioning method over another. For example, one or more criteria may be used by a UE 105 to evaluate the best suited positioning method, which may be prioritized by the UE 105. The criteria, for example, may be based on configuration parameters for the multiple positioning methods received by the UE 105 in assistance data. The UE 105 may provide an indication of the prioritized positioning method to a network entity, such as location server 152 or base station 110, either before performing the positioning measurement or after performing the positioning measurement. If the prioritized positioning method is provided to the network entity prior to performing the positioning measurement, the network entity and respond by accepting or rejecting the UE's prioritized positioning method. The UE 150 may additionally send to the network entity an indication of the criteria used to determine the prioritized positioning method.

The assistance data provided to the UE 105 includes configuration parameters for the positioning methods such as the time and frequency resources for DL and UL reference signals (e.g., DL PRS and UL SRS) to be used for positioning, such as configuration parameters for various base stations/TRPs and associated bands and frequency layers to be measured or the time and frequency of resources for UL reference signals (such as SRS) to be transmitted for the positioning methods. The UE 105 may evaluate one or more criteria for each of the possible positioning methods using the configuration parameters received in the assistance data, as well as internal UE factors, such as battery power, group delay, etc., to determine a positioning method that is best suited for the UE 105, which the UE 105 may prioritize over other positioning methods.

By way of example, criteria that may be evaluated by the UE 105 for DL RS based positioning methods, such as DL-TDOA, and DL AOD, may include impacts related to throughput and user experience, radio frequency considerations, and synchronization requirements. Throughput impact, for example, may be evaluated based on the assistance data, and whether the UE 105 may determine if there are one or more TRPs to be measured that are outside the currently tuned bandwidth of the UE 105. For example, the presence of multiple of TRPs outside the current bandwidth of the UE 105 would require measurement gaps for measurement which will increase overhead and reduce the throughput for the UE 105. Thus, for example, if the number of TRPs outside the current bandwidth of the UE 105 and requiring measurement gaps exceeds a predetermined threshold, the UE 105 may deprioritize DL RS based positioning methods.

User experience impact may be evaluated based on the current active use case and applications and requirements to maintain the user experience. The UE 105, for example, may determine if there are any currently running applications that require extensive use of the downlink channel or the uplink channel. If intensive use of one channel, e.g., DL or UL, is required by a running application, permitting continued use of that channel is a key requirement for meeting the user's experience. Thus, a suitable positioning method may be determined that does not impact the user experience based on the current running applications and their requirements. For example, if the current use case or application for the UE 105 requires one channel over the other, e.g., the downlink channel, for maintaining the user's experience, the UE 105 may deprioritize the positioning methods that use the required channel, e.g., deprioritize DL RS based positioning methods in the current example.

Radio frequency considerations may also be evaluated. For example, the UE 105 may be operating with multiple radios during positioning session, such as with E-UTRAN New Radio-Dual Connectivity (ENDC) non-standalone (NSA) in Single SIM/Subscription mode or multi radio across different subscriptions. Based on the radio frequency design for the UE 105, some of the inter-frequency measurement may be highly impacted by harmonic interference or intermodulation distortion (IMD) interference. Moreover, some of the requested positioning measurement on certain bands or frequencies may not be possible due to radio frequency signal path limitations. If there are number of TRPs in the assistance data that are impacted due to the radio frequency constraints, the UE 105 may deprioritize the DL RS based positioning methods.

Synchronization requirements may also be evaluated. For example, DL RS based positioning methods typically require synchronization between all the measured TRPs. Accordingly, the UE 105 may evaluate whether synchronization issues may be present. For example, the UE may use known techniques to determine whether Remote Radio Heads (RRH) may be used, which suffer from lack of synchronization. If synchronization issues are detected, e.g., based on the presence of RRH in multiple TRPs in the assistance data, the UE 105 may deprioritize DL RS based positioning methods.

The UE 105 may accordingly evaluate one or more of the criteria to determine if DL RS based positioning methods are preferred or not. For example, any one of the criteria may cause the UE 105 to downgrade the priority of the DL RS based positioning methods. Based on the various criteria and considerations, for example, the UE 105 may generate a ranking for the DL RS based positioning methods.

Additionally, criteria that may also be evaluated by the UE 105 for UL RS based positioning methods, such as UL-TDOA, UL-AOA. Criteria that may be used to evaluation UL RS based positioning may include, e.g., power limitations, battery considerations, and radio frequency considerations. For example, power limitations may be evaluated. One of the key consideration for UL RS based positioning, for example, is the transmit power of the UE 105. Specially, when positioning in ENDC mode, the NR radio of a UE 105 is allowed to transmit only at a power that is left unused by the LTE radio due to dynamic power sharing (DPS). Consequently, it may be possible that the NR radio will not be allowed to transmit with sufficient power due to DPS. Accordingly, the UE 105 may determine if the NR radio's maximum power limit due to DPS is below the computed SRS power level by more than a pre-configured threshold, and, if so, the UE 105 may deprioritize the UL RS based positioning method because the UL RS is likely to be undetected at the network side.

Battery considerations may also be evaluated. For example, UL RS based positioning methods typically require a large amount of the battery power, particularly when the computed required transmit power is above approximately 10 dbm and the operating bandwidth is high. Accordingly, the UE 105 may determine, based on the UL resource assignment for SRS and the computed path loss, if the available battery power is sufficient, e.g., more than threshold over the transmit power requirements, and the UE 105 may deprioritize the UL RS positioning method if the available battery power is not adequate.

Radio frequency considerations may also be evaluated for UL RS based positioning methods. The UL RS based positioning methods for example, may include similar radio frequency considerations as the DL based positioning method. For example, similar to DL based positioning methods, UL RS based positioning methods include synchronization requirements across TRPs. Further, UL RS may cause interference to one of the active GNSS receivers due to harmonics or IMD interference. Accordingly, if the UE 105 is actively receiving GNSS and the UL RS may cause interference, the UL RS based positioning method may be deprioritized. The UE 105 may further determine radio frequency transmit signal path availability and deprioritize UL RS based positioning if availability is lacking.

The UE 105 may accordingly, evaluate one or more of the criteria to determine if UL RS based positioning methods are preferred or not. For example, any one of the criteria may cause the UE 105 to downgrade the priority of the UL RS based positioning methods. Based on the various criteria and considerations, for example, the UE 105 may generate a ranking for the UL RS based positioning methods.

Additionally, criteria that may also be evaluated by the UE 105 for combined DL and UL RS based positioning methods, e.g., RTT and multi-cell RTT. In RTT and multi-cell RTT positioning, for example, the UE or location server measures the RTT from UL and DL RSs from and to the UE. There is no time reference needed, and accordingly, synchronization across TRPs is necessary. Nevertheless, other criteria may be used to evaluate combined DL and UL RS based positioning methods, such as digital and group delay at the UE.

One of the key factor contributing to the inaccuracy to RTT and multi-cell RTT is the digital and group delay at the UE 105 due to a time delay between signal generation at the baseband with respect to signal transmission and reception at the antenna. Moreover, for multi-cell RTT, the group delays used across different TRPs is required to be the same. Accordingly, when the UE 105 is to perform multi-cell RTT across multiple different TRPs with significantly different bandwidths for which transmission and reception will occur using different transceivers (e.g., due to UE support capability), the UE 105 may deprioritize the combined DL and UL RS based positioning method, e.g., RTT and multi-cell RTT based positioning method.

The UE 105 may accordingly, evaluate one or more of the criteria to determine if combined DL and UL RS based positioning methods are preferred or not. For example, any one of the criteria may cause the UE 105 to downgrade the priority of the combined DL and UL RS based positioning methods. Based on the various criteria and considerations, for example, the UE 105 may generate a ranking for the DL and UL RS based positioning methods.

The criteria within a positioning method and across different positioning methods may be given the same weight or different weights. By way of example, a criterium related to power limitations for UL RS based positioning methods may be given more weight than a criterium related to user experience impact for DL RS based positioning methods. The weights given to different criteria may be predetermined. Moreover, weights applied to different criteria may be dynamically selected. For example, weights applied to different criteria may change based on the type of positioning session, e.g., an emergency positioning session may use different criteria weights (or different criteria in general) than a commercial positioning session.

Thus, the UE 105 may evaluate one or more of the criteria for each of the multiple positioning methods, e.g., DL, UL and combined DL and UL RS based positioning methods to determine a preferred type of positioning method. For example, after evaluating criteria for each type of positioning method and generating a ranking for each type of positioning method, the UE 105 may compare the rankings and determine the type of positioning method that is best suited, and thus, preferred by the UE 105. The UE 105 may accordingly, prioritize the preferred positioning method.

The UE 105 may provide the prioritized positioning method to a network entity, such as the location server 152 or base station 110, which the UE 105 determined based on different criteria, as discussed above. The UE 105 may provide the prioritized positioning method as part of a negotiation, e.g., where the network entity may accept or reject the prioritized positioning method, or may provide the prioritized positioning method for informational purposes.

As part of the procedure to provide assistance data to the UE 105, the location server 152 may specify multiple configuration parameters associated with each of a plurality of positioning methods. The assistance data specifying multiple configuration parameters associated with each of the plurality of positioning methods may be provided via, e.g., LPP transmission or broadcast. The UE 105 based on one or more criteria and the configuration parameters received in the assistance data and internal UE factors, may determine the preferred positioning method, i.e., the prioritized positioning method.

In one implementation, the UE 105 may perform the positioning measurements in accordance with prioritized positioning method. As part of the Provide Location information response message, in which the UE 105 provides the accumulated positioning measurements (for UE-assisted positioning), and/or position estimates (for UE-based positioning) to the location server 150, the UE 105 may include the positioning method, e.g., DL, UL, or combined DL and UL RS based positioning method, that was used to generate the positioning measurements and/or position estimate, along with the reason for using the positioning method, e.g., by indicating the criteria used to determine the prioritized positioning method. The location server 152 may use criteria used by the UE 105, for example, in future positioning sessions with the UE 105 or other UEs. For example, an indication that a DL RS based positioning method was used because the UE 105 battery power is insufficient for UL RS based positioning methods may inform the location server 152 to configure only DL RS based positioning methods for the UE 105 in following position requests. In another example, an indication that a combined Dl and UL RS based positioning method was used because synchronization issues deprioritized DL RS based positioning methods and UL RS based positioning methods may inform the location server 152 that other UEs near the same position as UE 105 will also face synchronization issues and, therefore, should be configured for combined DL and UL RS based positioning methods.

In another implementation, the prioritized positioning method determined by the UE 105 may be provided to a network entity, such as the location server 152 or base station 110, before performing the positioning measurements. For example, the UE 105 may provide the prioritized positioning method after receiving the assistance data but before performing the positioning measurement. The UE 105 may additionally provide the reason for prioritizing the positioning method, e.g., by indicating the criteria used to determine the prioritized positioning method. The network entity, e.g., location server 152 or base station 110, may accept the prioritized positioning method and the UE 105 may then use the prioritized positioning method. Alternatively, the network entity, e.g., the location server 152 or base station 110, may reject the prioritized positioning method and specify the positioning method to be used, and the UE 105 may then use the specified positioning method. The acceptance or rejection of the prioritized positioning method may be provided to the UE 105 by the location server 152 in an LLP Request Location Information message, in which the positioning method to be used is specified, and the UE 105 will perform the required measurements according to the negotiated positioning method.

Figure 5:
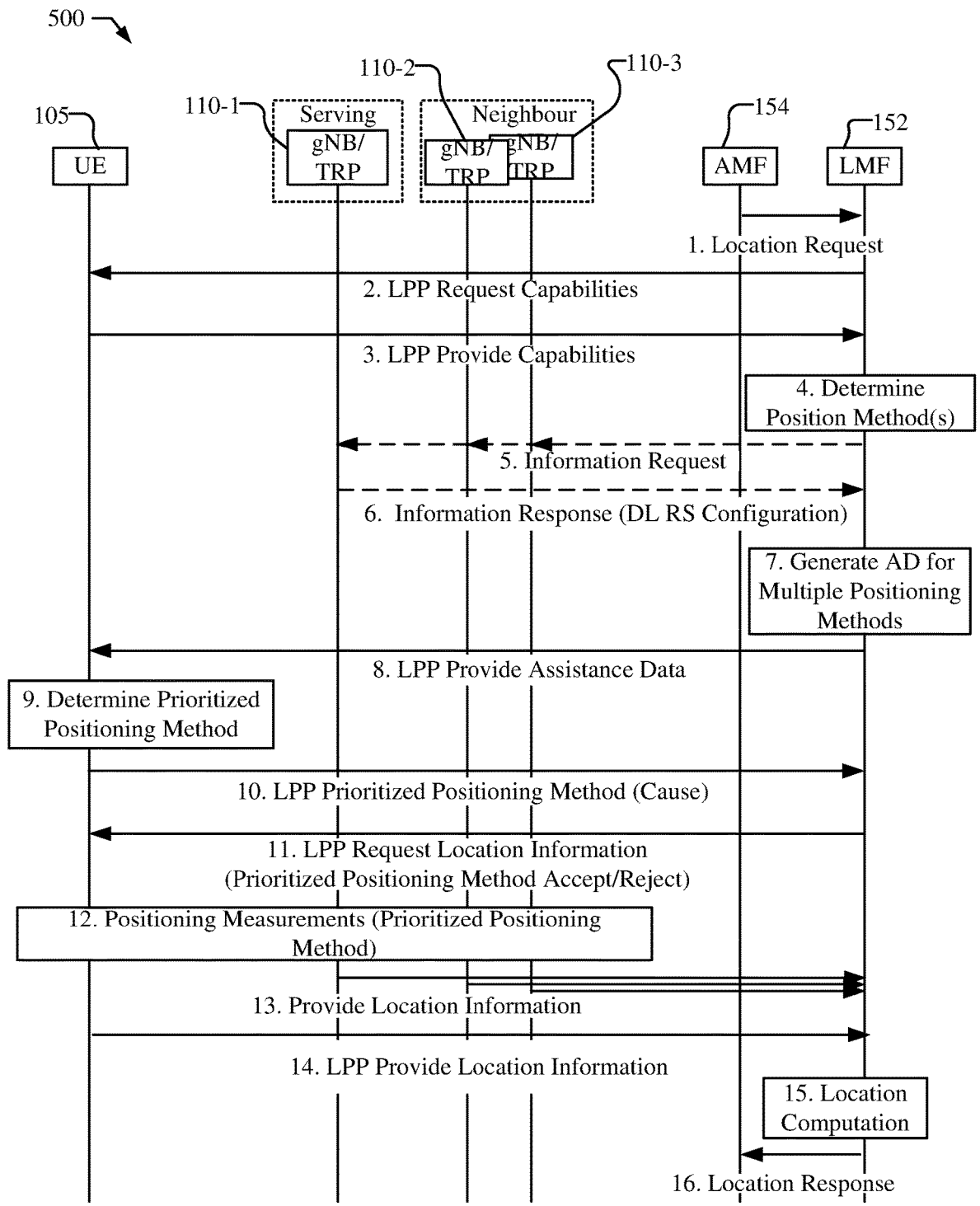
FIG. 5 is a message flow illustrating the messaging between the location server, base stations, and the UE for a positioning procedure using prioritization of positioning methods by the UE.

FIG. 5 is a message flow 500 illustrating the messaging between the location server 152, base stations 110, and the UE 105 for a positioning procedure using prioritization of positioning methods by the UE 105. The serving gNB 110-1 and multiple neighboring base stations 110-2 and 110-3 may be sometimes collectively referred to as base stations 110. The procedure illustrated in FIG. 5 is illustrated as a UE-assisted positioning procedure, but a UE-based positioning procedure may be performed similarly, as will be clear to those of ordinary skill in the art, and as discussed below. Additional, different, or fewer messages than shown in message flow 500 may be used for positioning. For example, additional messages may be used to initiate and end the positioning session, e.g., in a Mobile Terminating Location Request (MT-LR) or a Mobile Originated Location Request (MO-LR), or periodic or triggered positioning procedures.

At stage 1 in FIG. 5, LMF 152 receives a location request for UE 105 from AMF 154. For example, in communication system 100, client 130 may send a location request for UE 105 to GMLC 155 which forwards the request to AMF 154 (not shown in FIG. 5), which in turn sends the request to LMF 152 at stage 1.

At stage 2 in FIG. 5, LMF 152 sends an LPP Request Capabilities message to UE 105 via the serving AMF 154 and serving gNB 110 to request the positioning capabilities of UE 105. The Request Capabilities message may indicate the type of capabilities needed.

At stage 3, the UE 105 returns an LPP Provide Capabilities message to LMF 152 comprising the positioning capabilities of UE 105. UE 105, for example, may include its capability to support one or more of DL, UL, or combined DL and UL RS based positioning methods. In some implementations, the UE 105 may further indicate its capability to prioritize positioning methods, e.g., based on one or more criteria, configuration information received in assistance data and internal UE factors, as discussed above.

At stage 4, LMF 152 may determines one or more position methods with which to obtain a location estimate for UE 105. The position methods may be determined based on the positioning capabilities of UE 105 received at stage 3 and the capabilities of LMF 152. The positioning methods determined at stage 4, for example, include a plurality of positioning methods, including DL RS based positioning methods, such as DL-TDOA and DL-AOD, UL RS based positioning methods, such as UL-TDOA, UL-AOA, and combined DL and UL RS based positioning methods, such as RTT and multi-cell RTT.

At stage 5, the LMF 152 may optionally send an Information Request to the gNBs 110. For example, the Information Request may request that the gNBs 110 provide DL RS related configuration information for the one or more cells for gNB 110.

At stage 6, the gNBs 110 may return an Information Response to the LMF 152 providing the requested information, including the DL RS related information for the one or more cells for gNB 110, which, for example, may include frequency layer, resource set, and resource information for each base station. The Information Request of stage 5 and the Information Response of stage 6 may be, e.g., Long Term Evolution (LTE) Positioning Protocol A (LPPa) or New Radio Position Protocol A (NRPPa) messages.

At stage 7, the LMF 152 may generate positioning assistance data (AD) for multiple positioning methods for the UE 105, e.g., using information received in the Information Response from the gNBs 110 at stage 6 or configuration information obtained elsewhere for gNBs 110. The assistance data may include assistance data for the serving gNB 110-1 and neighbor gNBs 110-2, 110-3. The assistance data includes configuration information for multiple positioning methods, including, e.g., two or more of DL RS based positioning methods, UL RS based positioning methods, and combined DL and UL RS based positioning methods.

At stage 8, the LMF 152 provides the assistance data to the UE 105—e.g. by sending the assistance data as part of an LPP Provide Assistance Data message to UE 105.

At stage 9, the UE 105 determines a prioritized positioning method, e.g., based on one or more criteria and the configuration parameters received in the assistance data in stage 8 and internal UE factors, as discussed above. The criteria used to evaluate each of the positioning methods may be related to configuration information for the gNBs 110, their frequency layer, possible interference between gNBs, synchronization requirements, as well as internal factors, such as power limitations, battery power, interference with GNSS reception, group delay, etc., as detailed above. The one or more criteria used to evaluate the positioning methods may be unweighted or given a predetermined weight or dynamic weight, e.g., based on the type of positioning session, e.g., emergency positioning session or commercial positioning session. The UE 105 may evaluate each type of positioning method, e.g., deprioritizing positioning methods based on the various criteria, to generate a ranking for each type of positioning method. The ranking of the various positioning methods may be compared to determine the preferred, i.e., prioritized, positioning method.

At stage 10, the may UE 105 sends a message to a network entity, illustrated in FIG. 5 as the LMF 152, indicating the prioritized positioning method, e.g., in an LPP message or RRC message. In some implementations, the UE 105 may send the message indicating the prioritized positioning method to the serving gNB 110-1 or other another network entity, such as a RAN based location server. In some implementations, the message indicating the prioritized positioning method may further include the cause for prioritizing the positioning method, e.g., by indicating the one or more criteria that resulted in prioritization of the positioning method.

Figure 10:
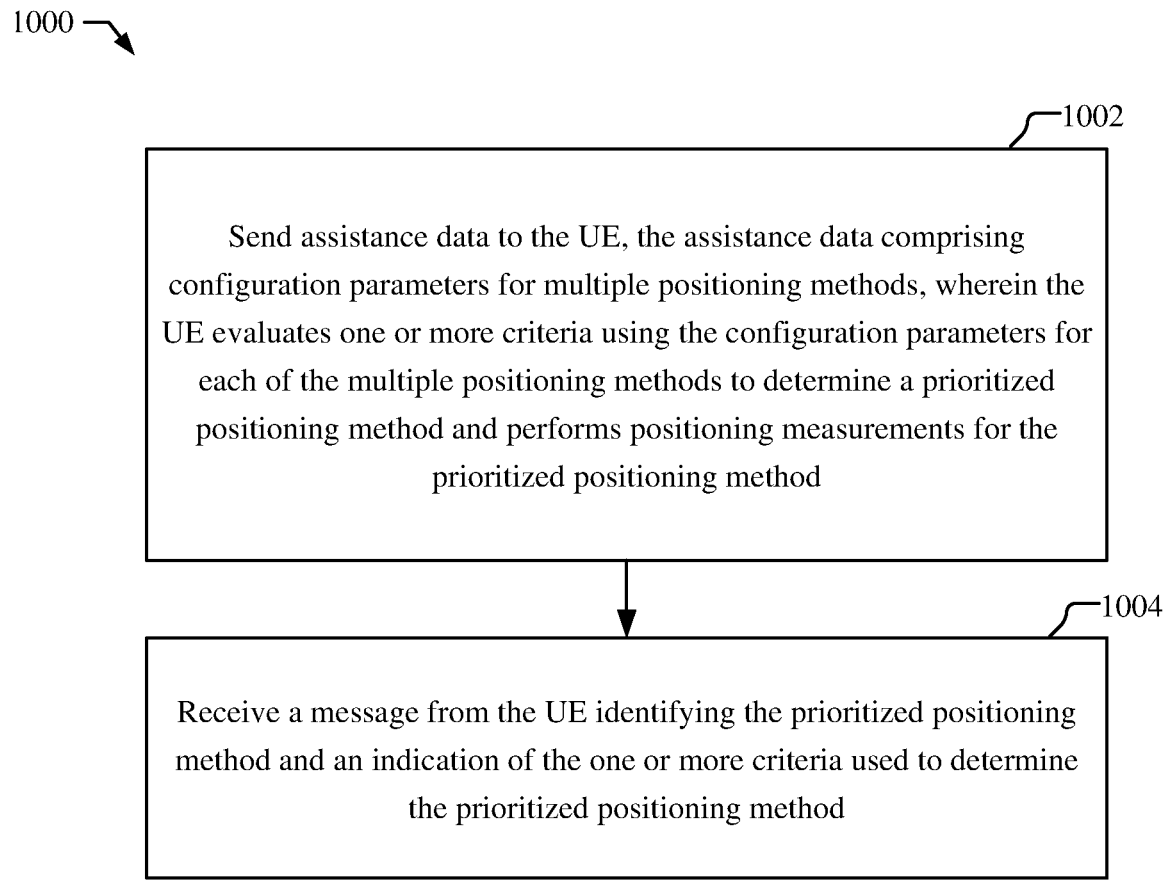
FIG. 10 shows a flowchart for an exemplary method for supporting location services for a UE in a wireless network performed by the location server.

At stage 11, the LMF 152 sends an LPP Request Location Information message to the UE 105 to request positioning information. In implementations, where the UE 105 provided the prioritized positioning method to the LMF 152, e.g., as shown in FIG. 10, the Request Location Information message at stage 11 may be used to accept (or reject) the prioritized positioning method, for example, by identifying the positioning method to be used to obtain the positioning information. In some implementations, the acceptance (or rejection) of the prioritized positioning method may be sent to the UE 105 in a message that is separate from the Request Location Information message, e.g., if the UE 105 sent the indication of the prioritized positioning method in stage 10 to the serving gNB 110-1 or another network entity, or if during a periodic or triggered positioning session wherein a Request Location Information may not be sent. The message may include, e.g., the type of location measurements, the desired accuracy, response time, etc.

At stage 12, the prioritized positioning measurements are performed, by the UE 105 (for DL RS based positioning methods), the gNBs 110 (for UL RS based positioning methods), or both the UE 105 and the gNBs 110 (for combined DL and UL RS based positioning methods). For example, for DL RS based positioning methods, the gNBs 110 may transmit DL RS, such as PRS, which is received and measured by the UE 105, e.g., RSTD, RSRP, Rx-Tx, etc., for DL-TDOA, DL-AOD, or any other desired DL RS based positioning method. For UL RS based positioning methods, the UE 105 may transmit UL RS, such as SRS, which is received and measured by the gNBs 110, e.g., RSTD, Rx-Tx, etc., for UL-TDOA, UL-AOA, or any other desired UL RS based positioning method. For combined DL and UL RS based positioning methods, both the gNBs 110 and the UE 105 may respectively transmit DL RS, such as PRS, and UL RS, such as SRS, which is received and measured by the UE 105 and gNBs 110, respectively, e.g., Rx-Tx, etc., for RTT or multi-cell RTT, or any other desired combined DL and UL RS based positioning method.

At stage 13, the gNBs 110 may send location measurements to the LMF 152, e.g., if the prioritized positioning method performed in stage 12 was UL RS based positioning method or a combined DL and UL RS based positioning method. In some implementations, e.g., in a UE-based positioning procedure, the gNBs 110 may send the location measurements to the UE 105.

At stage 14, the UE 105 sends an LPP Provide Location Information message to the LMF 152, which may include position measurements obtained at stage 12, if the prioritized positioning method performed in stage 12 was DL RS based positioning method or a combined DL and UL RS based positioning method. The message in stage 14 may further or alternatively include a location estimate if determined by the UE in a UE-based positioning procedure. For example, the UE 105 may determine a location estimate for UE 105 at stage 14, before sending the message, using the measurements obtained at stage 12, e.g., using information provided in the assistance data at stage 8, such as location coordinates for gNB 110 and other gNBs 110 and information related to transmission timing (e.g. such as real time differences between pairs of gNBs 110 and/or a level of synchronization of transmission timing for different gNBs 110), and location measurements received from gNBs 110, e.g., stage 13.

At stage 15, the LMF 152 may determine (or verify) the UE location using the received location information from stages 13 and 14.

At stage 16, LMF 152 returns the UE location to AMF 154 which may in turn return the location to external client 130 via GMLC 155 (not shown in FIG. 5).

Figure 6:
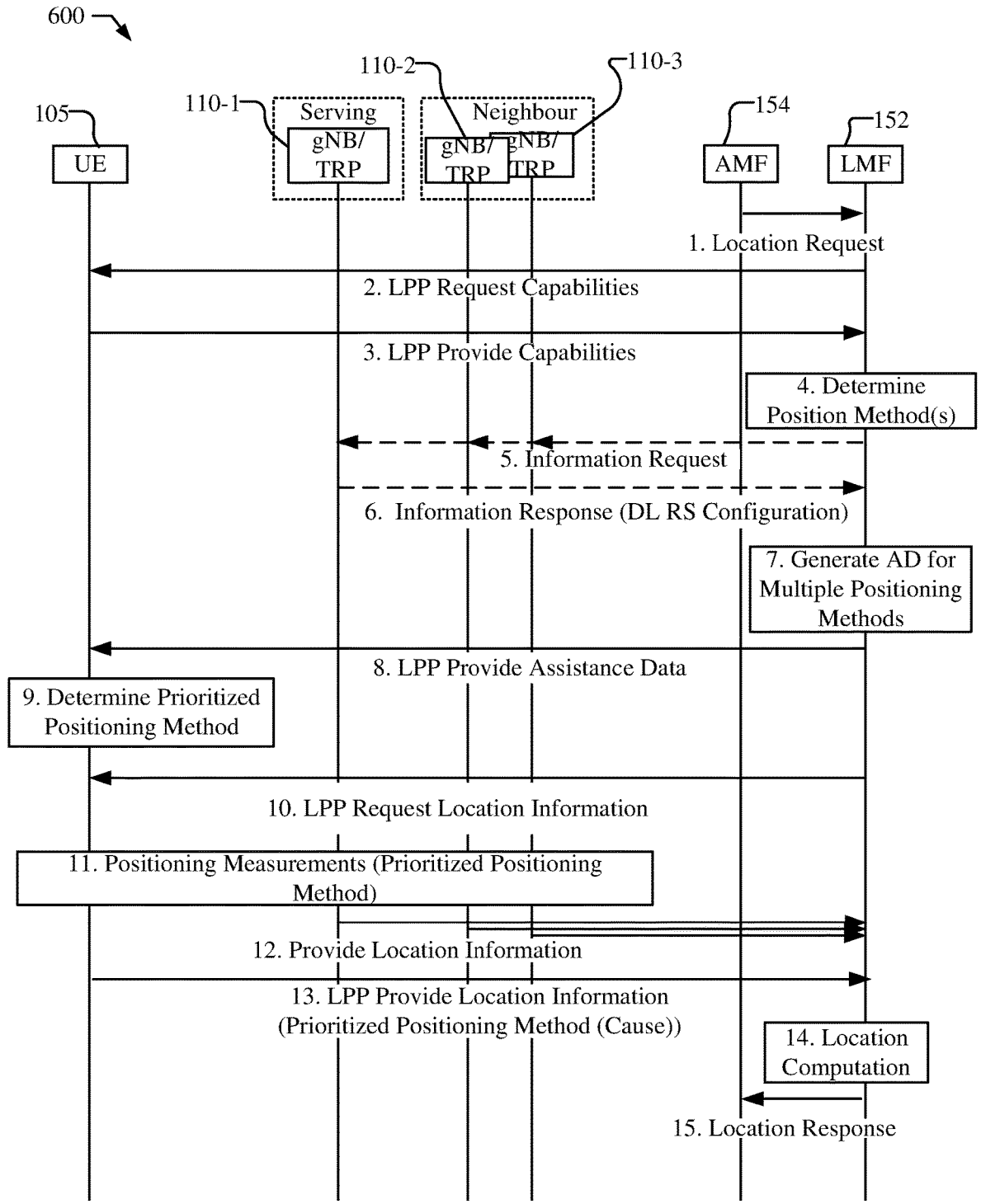
FIG. 6 is another message flow illustrating the messaging between the location server, base stations, and the UE for a positioning procedure using prioritization of positioning methods by the UE.

FIG. 6 is a message flow 600 illustrating the messaging between the location server 152, base stations 110, and the UE 105 for a positioning procedure using prioritization of positioning methods by the UE 105. Message flow 600 is similar to message flow 500 discussed above, but the prioritized positioning method is sent to the LMF 152 after the positioning measurements are performed, instead of before performing the positioning measurements as illustrated in FIG. 5. The serving gNB 110-1 and multiple neighboring base stations 110-2 and 110-3 may be sometimes collectively referred to as base stations 110. The procedure illustrated in FIG. 6 is illustrated as a UE-assisted positioning procedure, but a UE-based positioning procedure may be performed similarly, as will be clear to those of ordinary skill in the art, and as discussed below. Additional, different, or fewer messages than shown in message flow 600 may be used for positioning. For example, additional messages may be used to initiate and end the positioning session, e.g., in a MT-LR or a MO-LR, or periodic or triggered positioning procedures.

Stages 1-9 of FIG. 6 may be the same as stages 1-9 discussed in FIG. 5. As illustrated in FIG. 6, however, in message flow 600, the UE does not send an indication of the prioritized positioning method prior to performing the positioning measurements.

At stage 10 of FIG. 6, the LMF 152 sends an LPP Request Location Information message to the UE 105 to request positioning information. The message may include, e.g., the type of location measurements, the desired accuracy, response time, etc.

At stage 11 of FIG. 6, the prioritized positioning measurements are performed, by the UE 105 (for DL RS based positioning methods), the gNBs 110 (for UL RS based positioning methods), or both the UE 105 and the gNBs 110 (for combined DL and UL RS based positioning methods). For example, for DL RS based positioning methods, the gNBs 110 may transmit DL RS, such as PRS, which is received and measured by the UE 105, e.g., RSTD, RSRP, Rx-Tx, etc., for DL-TDOA, DL-AOD, or any other desired DL RS based positioning method. For UL RS based positioning methods, the UE 105 may transmit UL RS, such as SRS, which is received and measured by the gNBs 110, e.g., RSTD, Rx-Tx, etc., for UL-TDOA, UL-AOA, or any other desired UL RS based positioning method. For combined DL and UL RS based positioning methods, both the gNBs 110 and the UE 105 may respectively transmit DL RS, such as PRS, and UL RS, such as SRS, which is received and measured by the UE 105 and gNBs 110, respectively, e.g., Rx-Tx, etc., for RTT or multi-cell RTT, or any other desired combined DL and UL RS based positioning method.

At stage 12, the gNBs 110 may send location measurements to the LMF 152, e.g., if the prioritized positioning method performed in stage 12 was UL RS based positioning method or a combined DL and UL RS based positioning method. In some implementations, e.g., in a UE-based positioning procedure, the gNBs 110 may send the location measurements to the UE 105.

At stage 13, the UE 105 sends an LPP Provide Location Information message to the LMF 152 that indicates the prioritized positioning method used in the positioning measurements. The message may include the cause for prioritizing the positioning method, e.g., by indicating the one or more criteria that resulted in prioritization of the positioning method. The LMF 152, for example, may consider the indication for the cause for prioritizing the positioning method when determining positioning methods (e.g., at stage 4) in future positioning session with the UE 105 or for other UEs in the same approximate location as the UE 105. The message in stage 13 may further include position measurements obtained at stage 11, if the prioritized positioning method performed in stage 11 was DL RS based positioning method or a combined DL and UL RS based positioning method. The message in stage 13 may further or alternatively include a location estimate if determined by the UE in a UE-based positioning procedure. For example, the UE 105 may determine a location estimate for UE 105 at stage 13, before sending the message, using the measurements obtained at stage 11, e.g., using information provided in the assistance data at stage 8, such as location coordinates for gNB 110 and other gNBs 110 and information related to transmission timing (e.g. such as real time differences between pairs of gNBs 110 and/or a level of synchronization of transmission timing for different gNBs 110), and location measurements received from gNBs 110, e.g., stage 12.

At stage 14, the LMF 152 may determine (or verify) the UE location using the received location information from stages 12 and 13.

At stage 15, LMF 152 returns the UE location to AMF 154 which may in turn return the location to external client 130 via GMLC 155 (not shown in FIG. 6).

Figure 7:
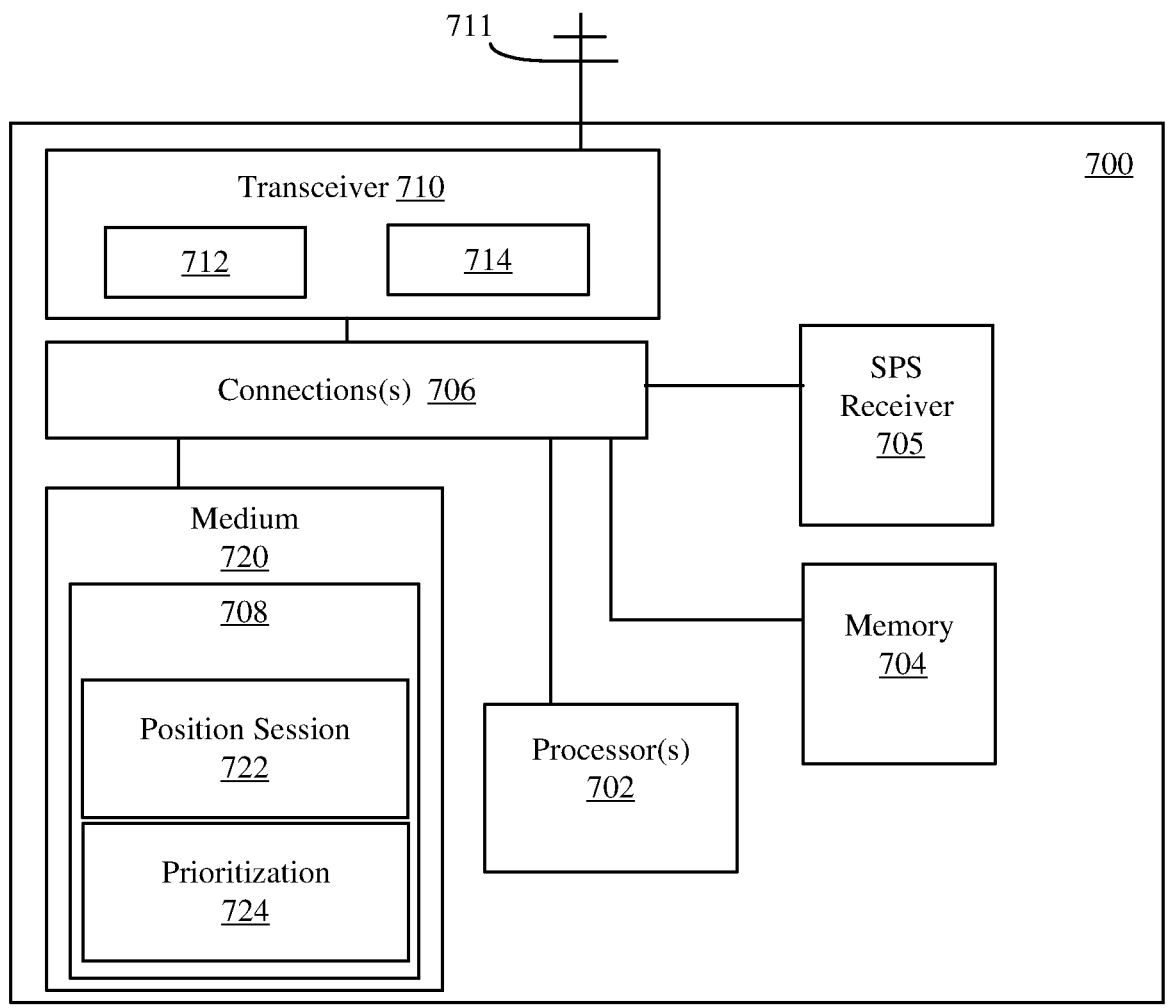
FIG. 7 shows a schematic block diagram illustrating certain exemplary features of a UE enabled to support for positioning procedure using prioritization of positioning methods by the UE.

FIG. 7 shows a schematic block diagram illustrating certain exemplary features of a UE 700, e.g., which may be UE 105 shown in FIGS. 1-3, 5, and 6, enabled to support for positioning procedure using prioritization of positioning methods by the UE, as described herein, e.g., in FIGS. 5 and 6. The UE 700 may be configured to perform the process flow shown in FIG. 9. UE 700 may, for example, include at least one processor 702, memory 704, an SPS receiver 705, an external interface such as a transceiver 710 (e.g., wireless network interface), which may be operatively coupled with one or more connections 706 (e.g., buses, lines, fibers, links, etc.) to non-transitory computer readable medium 720 and memory 704. The UE 700 may further include additional items, which are not shown, such as a user interface that may include e.g., a display, a keypad or other input device, such as virtual keypad on the display, through which a user may interface with the UE. In certain example implementations, all or part of UE 700 may take the form of a chipset, and/or the like. Transceiver 710 may, for example, include a transmitter 712 enabled to transmit one or more signals over one or more types of wireless communication networks and a receiver 714 to receive one or more signals transmitted over the one or more types of wireless communication networks.

In some embodiments, UE 700 may include antenna 711, which may be internal or external. UE antenna 711 may be used to transmit and/or receive signals processed by transceiver 710. In some embodiments, UE antenna 711 may be coupled to transceiver 710. In some embodiments, measurements of signals received (transmitted) by UE 700 may be performed at the point of connection of the UE antenna 711 and transceiver 710. For example, the measurement point of reference for received (transmitted) RF signal measurements may be an input (output) terminal of the receiver 714 (transmitter 712) and an output (input) terminal of the UE antenna 711. In a UE 700 with multiple UE antennas 711 or antenna arrays, the antenna connector may be viewed as a virtual point representing the aggregate output (input) of multiple UE antennas. In some embodiments, UE 700 may measure received signals including signal strength and TOA measurements and the raw measurements may be processed by the at least one processor 702.

The at least one processor 702 may be implemented using a combination of hardware, firmware, and software. For example, the at least one processor 702 may be configured to perform the functions discussed herein by implementing one or more instructions or program code 708 on a non-transitory computer readable medium, such as medium 720 and/or memory 704. In some embodiments, the at least one processor 702 may represent one or more circuits configurable to perform at least a portion of a data signal computing procedure or process related to the operation of UE 700.

The medium 720 and/or memory 704 may store instructions or program code 708 that contain executable code or software instructions that when executed by the at least one processor 702 cause the at least one processor 702 to operate as a special purpose computer programmed to perform the techniques disclosed herein. As illustrated in UE 700, the medium 720 and/or memory 704 may include one or more components or modules that may be implemented by the at least one processor 702 to perform the methodologies described herein. While the components or modules are illustrated as software in medium 720 that is executable by the at least one processor 702, it should be understood that the components or modules may be stored in memory 704 or may be dedicated hardware either in the at least one processor 702 or off the processors. A number of software modules and data tables may reside in the medium 720 and/or memory 704 and be utilized by the at least one processor 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include a position session module 722 that when implemented by the at least one processor 702 configures the at least one processor 702 to transmit and receive, via transceiver 710, messages with a location server to engage in a positioning session. The at least one processor 702 may be configured to receive and response to capabilities request message, to receive assistance data that includes configuration information for a plurality of positioning methods, to perform positioning measurements, including receiving and measuring DL RS, such as PRS, from base stations and/or transmit UL RS, such as SRS to base stations, to determine a position estimate (e.g., for a UE-based positioning procedure), and to transmit positioning information to the location server.

The medium 720 and/or memory 704 may include a prioritization module 724 that when implemented by the at least one processor 702 configures the at least one processor 702 to evaluate positioning methods based on different criteria based on configuration information received in the assistance data and internal UE factors, as discussed herein, e.g., at FIGS. 5 and 6. The criteria used to evaluate each of the positioning methods may be related to configuration information for the base stations, their frequency layer, possible interference between base stations, synchronization requirements, as well as internal factors, such as power limitations, battery power, interference with GNSS reception, group delay, etc., as detailed above. The at least one processor 702 may be configured to evaluate the criteria, including weighting criteria if appropriate, based on configuration information and internal UE factors, rank each positioning method and to prioritize the positioning method as discussed herein.

The methodologies described herein may be implemented by various means depending upon the application. For example, these methodologies may be implemented in hardware, firmware, software, or any combination thereof. For a hardware implementation, the at least one processor 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the at least one processor 702. Memory may be implemented within the at least one processor or external to the at least one processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support positioning procedures using prioritization of positioning methods by the UE in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause at least one processor to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from at least one processor 702, it should be understood that all or part of a primary memory may be provided within or otherwise co-located/coupled with the at least one processor 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by at least one processor 702 may be operatively enabled to perform all or portions of the example operations as described herein. Computer readable medium 720 may be a part of memory 704.

Figure 8:
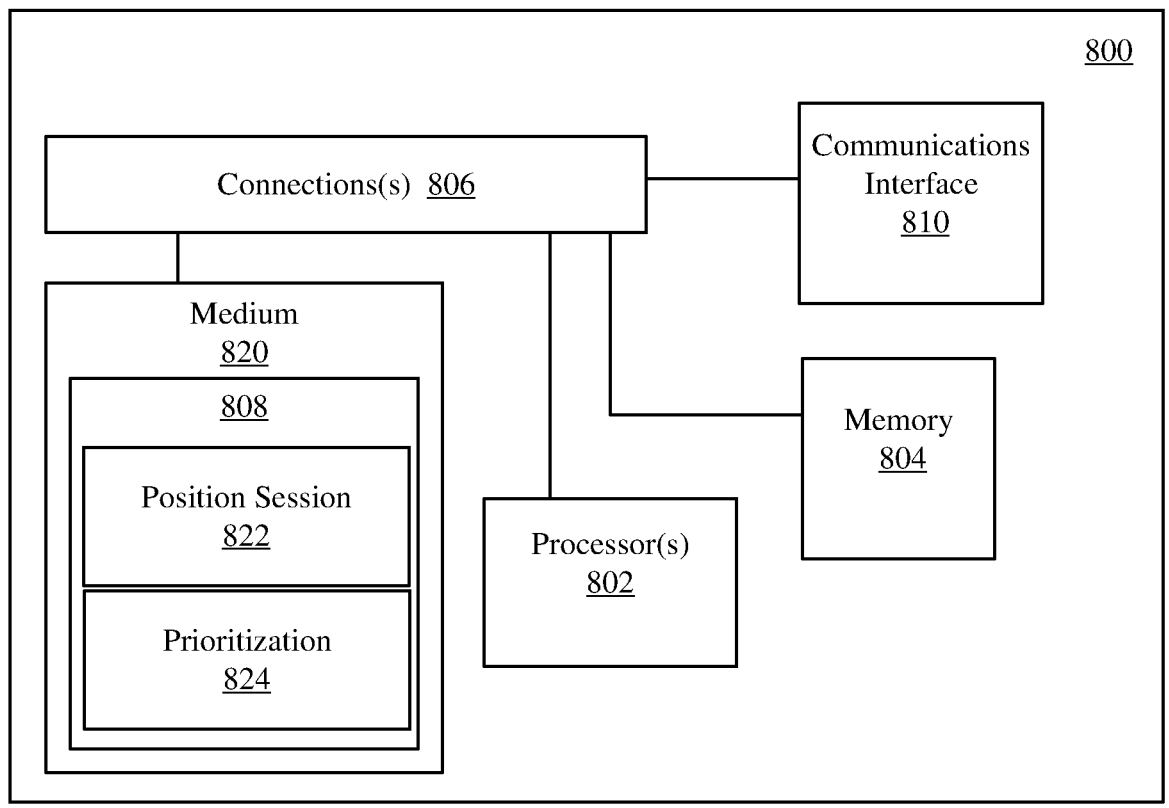
FIG. 8 shows a schematic block diagram illustrating certain exemplary features of a location server enabled to support for positioning procedure using prioritization of positioning methods by the UE.

FIG. 8 shows a schematic block diagram illustrating certain exemplary features of a location server 800, e.g., which may be LMF 152 shown in FIGS. 1-3, 5, and 6, enabled to support for positioning procedures using prioritization of positioning methods by a UE, as described herein. The location server 800 may be, e.g., LMF 152 or may be another network entity, such as an E-SMLC or SLP. The location server 800 may perform the process flow shown in FIG. 10. Location server 800 may, for example, include at least one processor 802, memory 804, and a communications interface 810 (e.g., wireline or wireless network interface to other network entities, such as core network entities and base stations), which may be operatively coupled with one or more connections 806 (e.g., buses, lines, fibers, links, etc.) to non-transitory computer readable medium 820 and memory 804. The location server 800 may further include additional items, which are not shown, such as a user interface that may include e.g., a display, a keypad or other input device, such as virtual keypad on the display, through which a user may interface with the location server. In certain example implementations, all or part of location server 800 may take the form of a chipset, and/or the like. The communications interface 810 may be a wired or wireless interface capable of connecting to base stations in the RAN or network entities, such as an AMF or MME.

The at least one processor 802 may be implemented using a combination of hardware, firmware, and software. For example, the at least one processor 802 may be configured to perform the functions discussed herein by implementing one or more instructions or program code 808 on a non-transitory computer readable medium, such as medium 820 and/or memory 804. In some embodiments, the at least one processor 802 may represent one or more circuits configurable to perform at least a portion of a data signal computing procedure or process related to the operation of location server 800.

The medium 820 and/or memory 804 may store instructions or program code 808 that contain executable code or software instructions that when executed by the at least one processor 802 cause the at least one processor 802 to operate as a special purpose computer programmed to perform the techniques disclosed herein. As illustrated in location server 800, the medium 820 and/or memory 804 may include one or more components or modules that may be implemented by the at least one processor 802 to perform the methodologies described herein. While the components or modules are illustrated as software in medium 820 that is executable by the at least one processor 802, it should be understood that the components or modules may be stored in memory 804 or may be dedicated hardware either in the at least one processor 802 or off the processors. A number of software modules and data tables may reside in the medium 820 and/or memory 804 and be utilized by the at least one processor 802 in order to manage both communications and the functionality described herein. It should be appreciated that the organization of the contents of the medium 820 and/or memory 804 as shown in location server 800 is merely exemplary, and as such the functionality of the modules and/or data structures may be combined, separated, and/or be structured in different ways depending upon the implementation of the location server 800.

The medium 820 and/or memory 804 may include a position session module 822 that when implemented by the at least one processor 802 configures the at least one processor 802 to engage in a positioning session for the UE. For example, the at least one processor 802 may be configured to engage in a positioning session by requesting and receive positioning capabilities from a UE, via the communications interface 810. The at least one processor 802 may be configured to generate and send positioning assistance data to the UE and/or serving base station, via the communications interface 810. The at least one processor 802 may further be configured to receive a measurement information report, via the communications interface 810, from the UE. The at least one processor 802 may further be configured to determine a position location for the UE based on the positioning measurements received in the measurement information report.

The medium 820 and/or memory 804 may include a prioritization module 824 that when implemented by the at least one processor 802 configures the at least one processor 802 to enable the location server to receive a prioritized positioning method along with the cause for prioritization, from a UE, via the communications interface 810, e.g., in a message prior to the UE performing the positioning measurements. The at least one processor 802 may be configured to evaluate the prioritized positioning measurement and the cause for prioritization and to send a message to the UE accepting or rejecting the prioritized positioning measurement. In some implementations, the at least one processor 802 may be configured to receive the prioritized positioning method along with the cause for prioritization, from a UE, via the communications interface 810, e.g., after the positioning measurements are performed. The at least one processor 802 may be configured to evaluate the prioritized positioning measurement and the cause and to use the prioritized positioning measurement for the UE in future positioning sessions or with other UEs located in the same approximate area.

The methodologies described herein may be implemented by various means depending upon the application. For example, these methodologies may be implemented in hardware, firmware, software, or any combination thereof. For a hardware implementation, the at least one processor 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the at least one processor 802. Memory may be implemented within the at least one processor or external to the at least one processor. As used herein the term "memory" refers to any type of long term, short term, volatile, non-volatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program code 808. For example, the non-transitory computer readable medium including program code 808 stored thereon may include program code 808 to support positioning procedures using prioritization of positioning methods by a UE in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include an communications interface 810 having signals indicative of instructions and data. The instructions and data are configured to cause at least one processor to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from at least one processor 802, it should be understood that all or part of a primary memory may be provided within or otherwise co-located/coupled with the at least one processor 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable program code 808 stored thereon, which if executed by at least one processor 802 may be operatively enabled to perform all or portions of the example operations as described herein. Computer readable medium 820 may be a part of memory 804.

Figure 9:
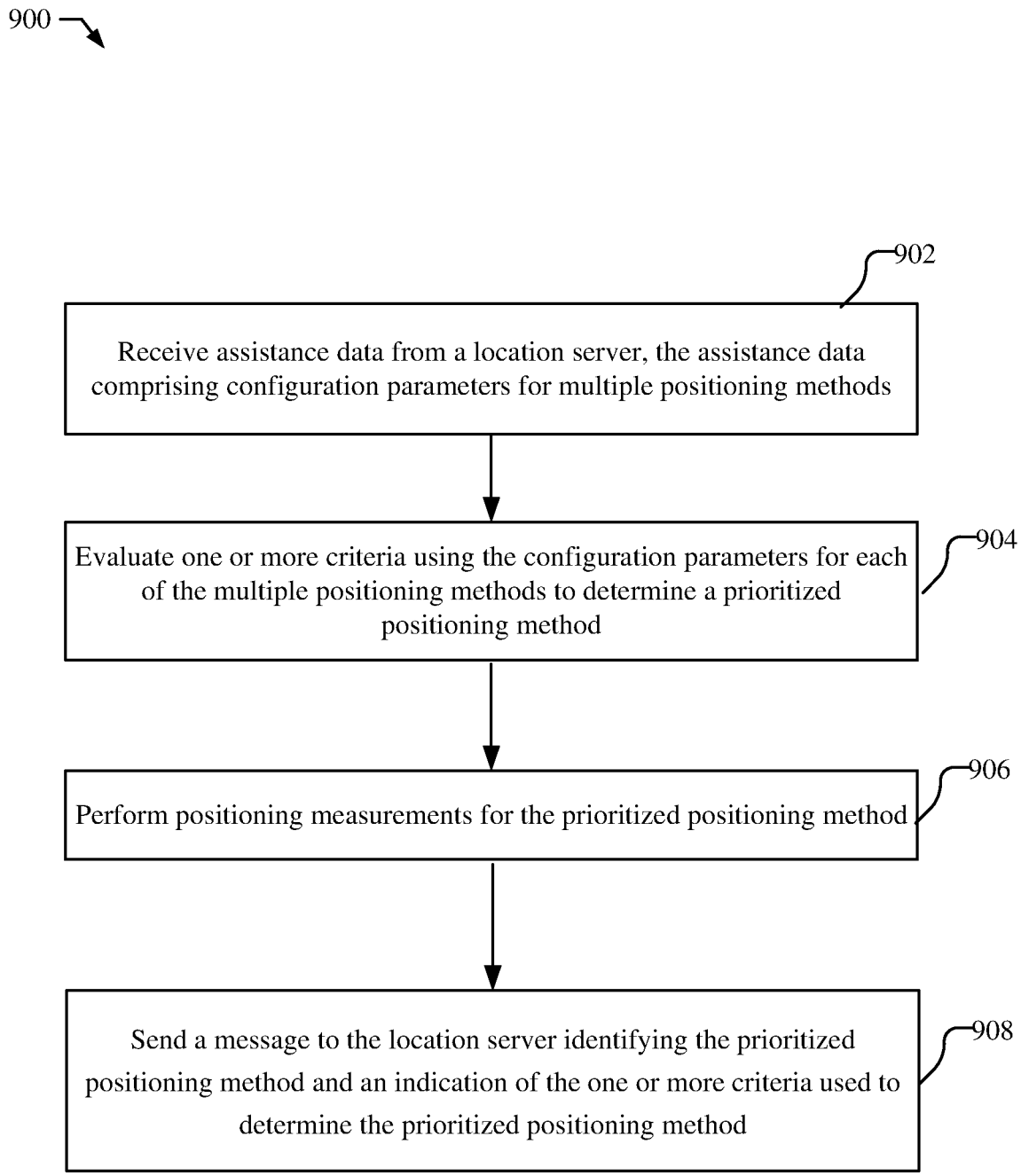
FIG. 9 shows a flowchart for an exemplary method for supporting location services for a UE in a wireless network performed by the UE.

FIG. 9 shows a flowchart for an exemplary process 900 for supporting location services for a user equipment (UE) in a wireless network performed by the UE, such as UE 105, in a manner consistent with disclosed implementation.

At block 902, the UE receives assistance data from a location server, the assistance data comprising configuration parameters for multiple positioning methods, e.g., as discussed at stage 8 in FIGS. 5 and 6. For example, the multiple positioning methods may include at least two of downlink reference signal based positioning, uplink reference signal based positioning, and a combination of downlink reference signal and uplink reference signal based positioning, e.g., as discussed at stages 7 and 8 of FIGS. 5 and 6. A means for receiving assistance data from a location server, the assistance data comprising configuration parameters for multiple positioning methods may include the wireless transceiver 710 and at least one processor 702 with dedicated hardware or implementing executable code or software instructions in memory 704 and/or medium 720, such as the position session module 722, in UE 700 shown in FIG. 7.

At block 904, the UE evaluates one or more criteria using the configuration parameters and internal UE factors for each of the multiple positioning methods to determine a prioritized positioning method, e.g., as discussed in stage 9 of FIGS. 5 and 6. A means for evaluating one or more criteria using the configuration parameters for each of the multiple positioning methods to determine a prioritized positioning method may include the wireless transceiver 710 and at least one processor 702 with dedicated hardware or implementing executable code or software instructions in memory 704 and/or medium 720, such as the prioritization module 724, in UE 700 shown in FIG. 7.

At block 906, the UE may perform positioning measurements for the prioritized positioning method, e.g., as discussed at stage 8 in FIGS. 5 and 6. A means for performing positioning measurements for the prioritized positioning method may include the wireless transceiver 710 and at least one processor 702 with dedicated hardware or implementing executable code or software instructions in memory 704 and/or medium 720, such as the position session module 722, in UE 700 shown in FIG. 7.

At block 908, the UE may send a message to the location server identifying the prioritized positioning method and an indication of the one or more criteria used to determine the prioritized positioning method, e.g., as discussed at stage 10 in FIG. 5 or stage 13 in 6. A means for sending a message to the location server identifying the prioritized positioning method and an indication of the one or more criteria used to determine the prioritized positioning method may include the wireless transceiver 710 and at least one processor 702 with dedicated hardware or implementing executable code or software instructions in memory 704 and/or medium 720, such as the prioritization module 724 and the position session module 722, in UE 700 shown in FIG. 7.

In one implementation, sending the message to the location server identifying the prioritized positioning method is performed before performing the positioning measurements, e.g., as discussed at stage 10 in FIG. 5. The UE may receive a second message from the location server to accept or reject the prioritized positioning method, wherein performing the positioning measurements for the prioritized positioning method is performed in response to the second message accepting the prioritized positioning method. A means for receiving a second message from the location server to accept or reject the prioritized positioning method, wherein performing the positioning measurements for the prioritized positioning method is performed in response to the second message accepting the prioritized positioning method may include the wireless transceiver 710 and at least one processor 702 with dedicated hardware or implementing executable code or software instructions in memory 704 and/or medium 720, such as the prioritization module 724, in UE 700 shown in FIG. 7.

In one implementation, sending the message to the location server identifying the prioritized positioning method is performed after performing the positioning measurements, e.g., as discussed at stage 13 in FIG. 6. The message to the location server, for example, may be a provide location information message and may include at least one of positioning measurement results and a position estimated determined by the UE based on the positioning measurement results, or a combination thereof.

In one implementation, the configuration parameters for the multiple positioning methods may include an identification of transmission reception points (TRPs), bandwidths, and frequencies and the internal UE factors include power limitations, battery power, interference with satellite positioning system reception, and group delay. For example, the one or more criteria may include criteria related to downlink reference signals based positioning methods and may include one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements. For example, the one or more criteria may include criteria related to uplink reference signals based positioning methods and may include one or more of power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs. For example, the one or more criteria may include criteria related to uplink reference signals and downlink reference signal based positioning methods and may include one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

FIG. 10 shows a flowchart for an exemplary process 1000 for supporting location services for a user equipment (UE) in a wireless network performed by a location server, such as LMF 152, in a manner consistent with disclosed implementation.

At block 1002, the location server may send assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method, e.g., as discussed at stages 8, 9, and 12 in FIG. 5 and stages 8, 9, and 11 in 6. For example, the multiple positioning methods may include at least two of downlink reference signal based positioning, uplink reference signal based positioning, and a combination of downlink reference signal and uplink reference signal based positioning, e.g., as discussed at stages 7 and 8 of FIGS. 5 and 6. A means for sending assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method may include the communications interface 810 and at least one processor 802 with dedicated hardware or implementing executable code or software instructions in memory 804 and/or medium 820, such as the position session module 822, in location server 800 shown in FIG. 8.

At block 1004, the location server may receive a message from the UE identifying the prioritized positioning method and an indication of the one or more criteria used to determine the prioritized positioning method, e.g., as discussed at stage 10 in FIG. 5 and stage 13 in FIG. 6. A means for receiving a message from the UE identifying the prioritized positioning method and an indication of the one or more criteria used to determine the prioritized positioning method may include the communications interface 810 and at least one processor 802 with dedicated hardware or implementing executable code or software instructions in memory 804 and/or medium 820, such as the position session module 822, in location server 800 shown in FIG. 8.

In one implementation, the message from the UE identifying the prioritized positioning method is received before the UE performs the positioning measurements, e.g., as discussed at stage 10 in FIG. 5. The UE may send a second message to the UE to accept or reject the prioritized positioning method, wherein the UE performs the positioning measurements for the prioritized positioning method in response to the second message accepting the prioritized positioning method, e.g., as discussed at stage 11 of FIG. 5. A means for sending a second message to the UE to accept or reject the prioritized positioning method, wherein the UE performs the positioning measurements for the prioritized positioning method in response to the second message accepting the prioritized positioning method may include the communications interface 810 and at least one processor 802 with dedicated hardware or implementing executable code or software instructions in memory 804 and/or medium 820, such as the prioritization module 824, in location server 800 shown in FIG. 8.

In one implementation, the message from the UE identifying the prioritized positioning method is received after the UE performs the positioning measurements, e.g., as discussed at stage 13 of FIG. 6. The message from the UE, for example, may be a provide location information message and may include at least one of positioning measurement results and a position estimated determined by the UE based on the positioning measurement results, or a combination thereof.

In one implementation, the configuration parameters for the multiple positioning methods may include an identification of transmission reception points (TRPs), bandwidths, and frequencies and the internal UE factors include power limitations, battery power, interference with satellite positioning system reception, and group delay. For example, the one or more criteria may include criteria related to downlink reference signals based positioning methods and may include one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements. For example, the one or more criteria may include criteria related to uplink reference signals based positioning methods and may include one or more of power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs. For example, the one or more criteria may include criteria related to uplink reference signals and downlink reference signal based positioning methods and may include one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a user equipment (UE) for supporting location services for the UE comprising: receiving assistance data from a location server, the assistance data comprising configuration parameters for multiple positioning methods; evaluating one or more criteria using the configuration parameters and internal UE factors for each of the multiple positioning methods to determine a prioritized positioning method; performing positioning measurements for the prioritized positioning method; and sending a message to the location server identifying the prioritized positioning method and an indication of the one or more criteria used to determine the prioritized positioning method.

Clause 2. The method of clause 1, wherein sending the message to the location server identifying the prioritized positioning method is performed before performing the positioning measurements.

Clause 3. The method of clause 2, further comprising receiving a second message from the location server to accept or reject the prioritized positioning method, wherein performing the positioning measurements for the prioritized positioning method is performed in response to the second message accepting the prioritized positioning method.

Clause 4. The method of clause 1, wherein sending the message to the location server identifying the prioritized positioning method is performed after performing the positioning measurements.

Clause 5. The method of clause 4, wherein the message to the location server is a provide location information message and includes at least one of positioning measurement results and a position estimated determined by the UE based on the positioning measurement results, or a combination thereof.

Clause 6. The method of any of clauses 1-5, wherein the multiple positioning methods comprise at least two of downlink reference signal based positioning, uplink reference signal based positioning, and a combination of downlink reference signal and uplink reference signal based positioning.

Clause 7. The method of any of clauses 1-6, wherein the configuration parameters for the multiple positioning methods comprises an identification of transmission reception points (TRPs), bandwidths, and frequencies and the internal UE factors comprise power limitations, battery power, interference with satellite positioning system reception, and group delay.

Clause 8. The method of clause 7, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 9. The method of clause 7, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 10. The method of clause 7, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 11. A user equipment (UE) configured to support location services for the UE, comprising: at least one wireless transceiver configured to wirelessly communicate with at least one wireless network; at least one memory; and at least one processor coupled to the at least one wireless transceiver and the at least one memory and configured to: receive, via the at least one wireless transceiver, assistance data from a location server, the assistance data comprising configuration parameters for multiple positioning methods; evaluate one or more criteria using the configuration parameters and internal UE factors for each of the multiple positioning methods to determine a prioritized positioning method; perform positioning measurements for the prioritized positioning method; and send, via the at least one wireless transceiver, a message to the location server identifying the prioritized positioning method and an indication of the one or more criteria used to determine the prioritized positioning method.

Clause 12. The UE of clause 11, wherein the at least one processor is configured to send the message to the location server identifying the prioritized positioning method before performing the positioning measurements.

Clause 13. The UE of clause 12, wherein the at least one processor is further configured to receive, via the at least one wireless transceiver, a second message from the location server to accept or reject the prioritized positioning method, wherein the at least one processor is configured to perform the positioning measurements for the prioritized positioning method in response to the second message accepting the prioritized positioning method.

Clause 14. The UE of clause 11, wherein the at least one processor is configured to send the message to the location server identifying the prioritized positioning method after performing the positioning measurements.

Clause 15. The UE of clause 14, wherein the message to the location server is a provide location information message and includes at least one of positioning measurement results and a position estimated determined by the UE based on the positioning measurement results, or a combination thereof.

Clause 16. The UE of any of clauses 11-15, wherein the multiple positioning methods comprise at least two of downlink reference signal based positioning, uplink reference signal based positioning, and a combination of downlink reference signal and uplink reference signal based positioning.

Clause 17. The UE of any of clauses 11-16, wherein the configuration parameters for the multiple positioning methods comprises an identification of transmission reception points (TRPs), bandwidths, and frequencies and the internal UE factors comprise power limitations, battery power, interference with satellite positioning system reception, and group delay.

Clause 18. The UE of clause 17, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 19. The UE of clause 17, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 20. The UE of clause 17, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 21. A user equipment (UE) configured for supporting location services for the UE comprising: means for receiving assistance data from a location server, the assistance data comprising configuration parameters for multiple positioning methods; means for evaluating one or more criteria using the configuration parameters and internal UE factors for each of the multiple positioning methods to determine a prioritized positioning method; means for performing positioning measurements for the prioritized positioning method; and means for sending a message to the location server identifying the prioritized positioning method and an indication of the one or more criteria used to determine the prioritized positioning method.

Clause 22. The UE of clause 21, wherein the means for sending the message to the location server identifying the prioritized positioning method sends the message before the positioning measurements are performed.

Clause 23. The UE of clause 22, further comprising means for receiving a second message from the location server to accept or reject the prioritized positioning method, wherein the means for performing the positioning measurements for the prioritized positioning method performs the positioning measurements in response to the second message accepting the prioritized positioning method.

Clause 24. The UE of clause 21, wherein the means for sending the message to the location server identifying the prioritized positioning method sends the message after the positioning measurements are performed.

Clause 25. The UE of clause 24, wherein the message to the location server is a provide location information message and includes at least one of positioning measurement results and a position estimated determined by the UE based on the positioning measurement results, or a combination thereof.

Clause 26. The UE of any of clauses 21-25, wherein the multiple positioning methods comprise at least two of downlink reference signal based positioning, uplink reference signal based positioning, and a combination of downlink reference signal and uplink reference signal based positioning.

Clause 27. The UE of any of clauses 21-26, wherein the configuration parameters for the multiple positioning methods comprises an identification of transmission reception points (TRPs), bandwidths, and frequencies and the internal UE factors comprise power limitations, battery power, interference with satellite positioning system reception, and group delay.

Clause 28. The UE of clause 27, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 29. The UE of clause 27, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 30. The UE of clause 27, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 31. A non-transitory storage medium including program code stored thereon, the program code is operable to configure at least one processor in a user equipment (UE) to support location services for the UE, the program code comprising instructions to: receive assistance data from a location server, the assistance data comprising configuration parameters for multiple positioning methods; evaluate one or more criteria using the configuration parameters and internal UE factors for each of the multiple positioning methods to determine a prioritized positioning method; perform positioning measurements for the prioritized positioning method; and send a message to the location server identifying the prioritized positioning method and an indication of the one or more criteria used to determine the prioritized positioning method.

Clause 32. The non-transitory storage medium of clause 31, wherein the program code comprises instructions to send the message to the location server identifying the prioritized positioning method before performing the positioning measurements.

Clause 33. The non-transitory storage medium of clause 32, wherein the program code further comprises instructions to receive a second message from the location server to accept or reject the prioritized positioning method, wherein the program code comprises instructions to perform the positioning measurements for the prioritized positioning method in response to the second message accepting the prioritized positioning method.

Clause 34. The non-transitory storage medium of clause 31, wherein the program code comprises instructions to send the message to the location server identifying the prioritized positioning method after performing the positioning measurements.

Clause 35. The non-transitory storage medium of clause 34, wherein the message to the location server is a provide location information message and includes at least one of positioning measurement results and a position estimated determined by the UE based on the positioning measurement results, or a combination thereof.

Clause 36. The non-transitory storage medium of any of clauses 31-35, wherein the multiple positioning methods comprise at least two of downlink reference signal based positioning, uplink reference signal based positioning, and a combination of downlink reference signal and uplink reference signal based positioning.

Clause 37. The non-transitory storage medium of any of clauses 31-36, wherein the configuration parameters for the multiple positioning methods comprises an identification of transmission reception points (TRPs), bandwidths, and frequencies and the internal UE factors comprise power limitations, battery power, interference with satellite positioning system reception, and group delay.

Clause 38. The non-transitory storage medium of clause 37, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 39. The non-transitory storage medium of clause 37, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 40. The non-transitory storage medium of clause 37, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 41. A method performed by a location server for supporting location services for a user equipment (UE) comprising: sending assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and receiving a message from the UE identifying the prioritized positioning method and an indication of the one or more criteria used to determine the prioritized positioning method.

Clause 42. The method of clause 41, wherein the message from the UE identifying the prioritized positioning method is received before the UE performs the positioning measurements.

Clause 43. The method of clause 42, further comprising sending a second message to the UE to accept or reject the prioritized positioning method, wherein the UE performs the positioning measurements for the prioritized positioning method in response to the second message accepting the prioritized positioning method.

Clause 44. The method of clause 41, wherein the message from the UE identifying the prioritized positioning method is received after the UE performs the positioning measurements.

Clause 45. The method of clause 44, wherein the message from the UE is a provide location information message and includes at least one of positioning measurement results and a position estimated determined by the UE based on the positioning measurement results, or a combination thereof.

Clause 46. The method of any of clauses 41-45, wherein the multiple positioning methods comprise at least two of downlink reference signal based positioning, uplink reference signal based positioning, and a combination of downlink reference signal and uplink reference signal based positioning.

Clause 47. The method of any of clauses 41-46, wherein the configuration parameters for the multiple positioning methods comprises an identification of TRPs, bandwidths, and frequencies.

Clause 48. The method of clause 47, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 49. The method of clause 47, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 50. The method of clause 47, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 51. A location server configured to support location services for a user equipment (UE), comprising: a communications interface configured to communicate a UE in a wireless network; at least one memory; and at least one processor coupled to the communications interface and the at least one memory and configured to: send assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and receive a message from the UE identifying the prioritized positioning method and an indication of the one or more criteria used to determine the prioritized positioning method.

Clause 52. The location server of clause 51, wherein the message from the UE identifying the prioritized positioning method is received before the UE performs the positioning measurements.

Clause 53. The location server of clause 52, wherein the at least one processor is further configured to send a second message to the UE to accept or reject the prioritized positioning method, wherein the UE performs the positioning measurements for the prioritized positioning method in response to the second message accepting the prioritized positioning method.

Clause 54. The location server of clause 51, wherein the message from the UE identifying the prioritized positioning method is received after the UE performs the positioning measurements.

Clause 55. The location server of clause 54, wherein the message from the UE is a provide location information message and includes at least one of positioning measurement results and a position estimated determined by the UE based on the positioning measurement results, or a combination thereof.

Clause 56. The location server of any of clauses 51-55, wherein the multiple positioning methods comprise at least two of downlink reference signal based positioning, uplink reference signal based positioning, and a combination of downlink reference signal and uplink reference signal based positioning.

Clause 57. The location server of any of clauses 51-56, wherein the configuration parameters for the multiple positioning methods comprises an identification of TRPs, bandwidths, and frequencies.

Clause 58. The location server of clause 57, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 59. The location server of clause 57, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 60. The location server of clause 57, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 61. A location server configured for supporting location services for a user equipment (UE) comprising: means for sending assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and means for receiving a message from the UE identifying the prioritized positioning method and an indication of the one or more criteria used to determine the prioritized positioning method.

Clause 62. The location server of clause 61, wherein the message from the UE identifying the prioritized positioning method is received before the UE performs the positioning measurements.

Clause 63. The location server of clause 62, further comprising means for sending a second message to the UE to accept or reject the prioritized positioning method, wherein the UE performs the positioning measurements for the prioritized positioning method in response to the second message accepting the prioritized positioning method.

Clause 64. The location server of clause 61, wherein the message from the UE identifying the prioritized positioning method is received after the UE performs the positioning measurements.

Clause 65. The location server of clause 64, wherein the message from the UE is a provide location information message and includes at least one of positioning measurement results and a position estimated determined by the UE based on the positioning measurement results, or a combination thereof.

Clause 66. The location server of any of clauses 61-65, wherein the multiple positioning methods comprise at least two of downlink reference signal based positioning, uplink reference signal based positioning, and a combination of downlink reference signal and uplink reference signal based positioning.

Clause 67. The location server of any of clauses 61-66, wherein the configuration parameters for the multiple positioning methods comprises an identification of TRPs, bandwidths, and frequencies.

Clause 68. The location server of clause 67, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 69. The location server of clause 67, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 70. The location server of clause 67, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Clause 71. A non-transitory storage medium including program code stored thereon, the program code is operable to configure at least one processor in a location server to support location services for a user equipment (UE), the program code comprising instructions to: send assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and receive a message from the UE identifying the prioritized positioning method and an indication of the one or more criteria used to determine the prioritized positioning method.

Clause 72. The non-transitory storage medium of clause 71, wherein the message from the UE identifying the prioritized positioning method is received before the UE performs the positioning measurements.

Clause 73. The non-transitory storage medium of clause 72, wherein the program code further comprises instructions to send a second message to the UE to accept or reject the prioritized positioning method, wherein the UE performs the positioning measurements for the prioritized positioning method in response to the second message accepting the prioritized positioning method.

Clause 74. The non-transitory storage medium of clause 71, wherein the message from the UE identifying the prioritized positioning method is received after the UE performs the positioning measurements.

Clause 75. The non-transitory storage medium of clause 74, wherein the message from the UE is a provide location information message and includes at least one of positioning measurement results and a position estimated determined by the UE based on the positioning measurement results, or a combination thereof.

Clause 76. The non-transitory storage medium of any of clauses 71-75, wherein the multiple positioning methods comprise at least two of downlink reference signal based positioning, uplink reference signal based positioning, and a combination of downlink reference signal and uplink reference signal based positioning.

Clause 77. The non-transitory storage medium of any of clauses 71-76, wherein the configuration parameters for the multiple positioning methods comprises an identification of TRPs, bandwidths, and frequencies.

Clause 78. The non-transitory storage medium of clause 77, the one or more criteria comprises criteria related to downlink reference signals based positioning methods comprising one or more of: throughput impact based on whether the TRPs are at frequencies outside a currently tuned bandwidth of the UE requiring measurement gaps for the positioning measurements; user experience impact based on whether the UE requires downlink or uplink channels for active applications; impact of harmonic interference or intermodulation distortion interference on inter-frequency measurements; radio frequency signal path limitations; and synchronization requirements.

Clause 79. The non-transitory storage medium of clause 77, the one or more criteria comprises criteria related to uplink reference signals based positioning methods comprising one or more of: power limitation constraints based on whether a maximum power limit due to dynamic power sharing is below an uplink reference signal power level by a configured threshold; battery constraints based on whether an uplink resource assignment for the uplink reference signals, computed path loss and a current battery threshold; impact to one or more satellite positioning system (SPS) receivers due to harmonic interference or intermodulation distortion interference; radio frequency transmit signal path availability; and synchronization requirements across TRPs.

Clause 80. The non-transitory storage medium of clause 77, the one or more criteria comprises criteria related to uplink reference signals and downlink reference signal based positioning methods comprising one or more of: first group delay characteristics at the UE due to a time delay between signal generation at a baseband modem with respect to signal transmission and reception at an antenna; and second group delay characteristics at the UE due to transmission and reception for different TRPs occurring on different transceivers at the UE.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for supporting location services for the UE comprising:
    receiving assistance data from a location server, the assistance data comprising configuration parameters for multiple positioning methods;
    evaluating one or more criteria using the configuration parameters and internal UE factors for each of the multiple positioning methods to determine a prioritized positioning method;
    performing positioning measurements for the prioritized positioning method; and
    sending a message to the location server identifying the prioritized positioning method and an indication of the one or more criteria used to determine the prioritized positioning method.

2. The method of claim 1, wherein sending the message to the location server identifying the prioritized positioning method is performed before performing the positioning measurements.

3. The method of claim 2, further comprising receiving a second message from the location server to accept or reject the prioritized positioning method, wherein performing the positioning measurements for the prioritized positioning method is performed in response to the second message accepting the prioritized positioning method.

4. The method of claim 1, wherein sending the message to the location server identifying the prioritized positioning method is performed after performing the positioning measurements.

5. The method of claim 4, wherein the message to the location server is a provide location information message and includes at least one of positioning measurement results and a position estimated determined by the UE based on the positioning measurement results, or a combination thereof.

6. The method of claim 1, wherein the multiple positioning methods comprise at least two of downlink reference signal based positioning, uplink reference signal based positioning, and a combination of downlink reference signal and uplink reference signal based positioning.

7. The method of claim 1, wherein the configuration parameters for the multiple positioning methods comprises an identification of transmission reception points (TRPs), bandwidths, and frequencies and the internal UE factors comprise power limitations, battery power, interference with satellite positioning system reception, and group delay.

8. A user equipment (UE) configured to support location services for the UE, comprising:
    at least one wireless transceiver configured to wirelessly communicate with at least one wireless network;
    at least one memory; and
    at least one processor coupled to the at least one wireless transceiver and the at least one memory and configured to:
        receive, via the at least one wireless transceiver, assistance data from a location server, the assistance data comprising configuration parameters for multiple positioning methods;
        evaluate one or more criteria using the configuration parameters and internal UE factors for each of the multiple positioning methods to determine a prioritized positioning method;
        perform positioning measurements for the prioritized positioning method; and
        send, via the at least one wireless transceiver, a message to the location server identifying the prioritized positioning method and an indication of the one or more criteria used to determine the prioritized positioning method.

9. The UE of claim 8, wherein the at least one processor is configured to send the message to the location server identifying the prioritized positioning method before performing the positioning measurements.

10. The UE of claim 9, wherein the at least one processor is further configured to receive, via the at least one wireless transceiver, a second message from the location server to accept or reject the prioritized positioning method, wherein the at least one processor is configured to perform the positioning measurements for the prioritized positioning method in response to the second message accepting the prioritized positioning method.

11. The UE of claim 8, wherein the at least one processor is configured to send the message to the location server identifying the prioritized positioning method after performing the positioning measurements.

12. The UE of claim 11, wherein the message to the location server is a provide location information message and includes at least one of positioning measurement results and a position estimated determined by the UE based on the positioning measurement results, or a combination thereof.

13. The UE of claim 8, wherein the multiple positioning methods comprise at least two of downlink reference signal based positioning, uplink reference signal based positioning, and a combination of downlink reference signal and uplink reference signal based positioning.

14. The UE of claim 8, wherein the configuration parameters for the multiple positioning methods comprises an identification of transmission reception points (TRPs), bandwidths, and frequencies and the internal UE factors comprise power limitations, battery power, interference with satellite positioning system reception, and group delay.

15. A method performed by a location server for supporting location services for a user equipment (UE) comprising:
   sending assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and
   receiving a message from the UE identifying the prioritized positioning method and an indication of the one or more criteria used to determine the prioritized positioning method.

16. The method of claim 15, wherein the message from the UE identifying the prioritized positioning method is received before the UE performs the positioning measurements.

17. The method of claim 16, further comprising sending a second message to the UE to accept or reject the prioritized positioning method, wherein the UE performs the positioning measurements for the prioritized positioning method in response to the second message accepting the prioritized positioning method.

18. The method of claim 15, wherein the message from the UE identifying the prioritized positioning method is received after the UE performs the positioning measurements.

19. The method of claim 18, wherein the message from the UE is a provide location information message and includes at least one of positioning measurement results and a position estimated determined by the UE based on the positioning measurement results, or a combination thereof.

20. The method of claim 15, wherein the multiple positioning methods comprise at least two of downlink reference signal based positioning, uplink reference signal based positioning, and a combination of downlink reference signal and uplink reference signal based positioning.

21. The method of claim 15, wherein the configuration parameters for the multiple positioning methods comprises an identification of TRPs, bandwidths, and frequencies.

22. A location server configured to support location services for a user equipment (UE), comprising:
   a communications interface configured to communicate a UE in a wireless network;
   at least one memory; and
   at least one processor coupled to the communications interface and the at least one memory and configured to:
      send assistance data to the UE, the assistance data comprising configuration parameters for multiple positioning methods, wherein the UE evaluates one or more criteria using the configuration parameters for each of the multiple positioning methods to determine a prioritized positioning method and performs positioning measurements for the prioritized positioning method; and
      receive a message from the UE identifying the prioritized positioning method and an indication of the one or more criteria used to determine the prioritized positioning method.

23. The location server of claim 22, wherein the message from the UE identifying the prioritized positioning method is received before the UE performs the positioning measurements.

24. The location server of claim 23, wherein the at least one processor is further configured to send a second message to the UE to accept or reject the prioritized positioning method, wherein the UE performs the positioning measurements for the prioritized positioning method in response to the second message accepting the prioritized positioning method.

25. The location server of claim 22, wherein the message from the UE identifying the prioritized positioning method is received after the UE performs the positioning measurements.

26. The location server of claim 25, wherein the message from the UE is a provide location information message and includes at least one of positioning measurement results and a position estimated determined by the UE based on the positioning measurement results, or a combination thereof.

27. The location server of claim 22, wherein the multiple positioning methods comprise at least two of downlink reference signal based positioning, uplink reference signal based positioning, and a combination of downlink reference signal and uplink reference signal based positioning.

28. The location server of claim 22, wherein the configuration parameters for the multiple positioning methods comprises an identification of TRPs, bandwidths, and frequencies.

* * * * *